United States Patent [19]
Narisawa et al.

[11] Patent Number: 6,041,128
[45] Date of Patent: *Mar. 21, 2000

[54] BATTERY RECEIVING CHAMBER AND HEARING AID

[75] Inventors: Yoshiyuki Narisawa; Toshiyuki Araki, both of Tokyo, Japan

[73] Assignee: Rion Kabushiki Kaisha, Tokyo, Japan

[*] Notice: This patent is subject to a terminal disclaimer.

[21] Appl. No.: 08/380,553

[22] Filed: Jan. 30, 1995

[30] Foreign Application Priority Data

| Jan. 31, 1994 | [JP] | Japan | 6-027389 |
| Feb. 4, 1994 | [JP] | Japan | 6-033063 |
| Feb. 4, 1994 | [JP] | Japan | 6-033160 |

[51] Int. Cl.$^7$ ........................... H04R 25/00
[52] U.S. Cl. ................. 381/322; 381/323; 381/330
[58] Field of Search ............... 381/68, 68.1, 68.5, 381/68.6, 68.7, 23.1, 69, 69.2; 429/96, 97, 100

[56] References Cited

U.S. PATENT DOCUMENTS

| 5,187,746 | 2/1993 | Narisawa | 381/69.2 |
| 5,471,667 | 11/1995 | Yamada | 429/100 |

FOREIGN PATENT DOCUMENTS

| 3-6075 | 2/1991 | Japan . |
| 3-39440 | 6/1991 | Japan . |
| 4-81450 | 7/1992 | Japan . |

*Primary Examiner*—Huyen Le
*Attorney, Agent, or Firm*—Frommer Lawrence & Haug, LLP.; William S. Frommer

[57] ABSTRACT

In a battery receiving chamber, the first convex part is formed in the internal side face of the battery compartment and the second convex part which corresponds to the first convex part is formed in the battery cover, the first and second convex part respectively having the inclined faces which gradually rise toward the rotational direction in which the battery cover is detached from the battery compartment, so that a battery receiving chamber having good usage convenience and highly reliable can be realized. Further, in a hearing aid using the above, waterproof means is located so as to block the air vent formed in the battery cover, and a slot connecting the end part of battery cover and the air vent in the external side face of the battery cover is comprised, so that a hearing aid which can supply practically sufficient volume of air into the case and has high waterproof performance can be realized. Further, the case of this hearing aid is divided into two that the first half-case for receiving the earphone, and the second half-case for receiving the microphone, and the joint part between the first and second-half cases is formed so as to substantially flat, in order to apply stress without bias to the waterproof member inserted into the joint part. Thereby, a hearing aid in which the waterproof performance can be further improved can be realized.

7 Claims, 17 Drawing Sheets

BATTERY RECEIVING CHAMBER AND HEARING AID

BACKGROUND OF THE INVENTION

1. Field of the Invention

This invention relates to a battery receiving chamber and a hearing aid using the same, and more particularly, is suitable to a waterproof type of hearing aid.

2. Description of the Related Art

Heretofore, in this type of hearing aid, a waterproof function has been attained by increasing a degree of tight-coupling between components.

As this type of hearing aid, there is an ear-hung type of hearing aid 1 (Japanese Patent Publication No. 3-39440 and Japanese Utility Model Publication No. 3-6075) as shown in FIG. 1. That is, in the hearing aid 1, a hook 3 is spring-coupled to an edge part of a case 2 formed in an arched shape as a whole, and the entire hearing aid 1 can be held at a backside position of user's earlobe by hanging the hook 3 on the upper end part of user's earlobe.

By attaching a tube and an ear plug (not shown) to an edge of the hook 3, the hearing aid 1 can send hearing aid sound, which is obtained from the earphone, into user's ear-hole through a sound path in the hook 3, the tube and ear plug.

A case 2 comprises a case itself 4, a case chassis 5, and a battery cover 7, and the case itself 4 internally includes a microphone, a processing circuit for hearing aid sound, an earphone, and the like. The case chassis 5 is pivotally joined to the case itself 4 by making a pivot (not shown), which is located at an end of the case itself 4, a rotation center. Therefore, in the hearing aid 1, each part built in the case itself 4 is adjusted and repaired after making the case chassis 5 open by rotating the case chassis 5 toward an arrow "a".

A battery cover 7 is pivotally joined to a base part of the case itself 4 by making a pivot 6 a rotation center. Thus, in the hearing aid 1, a battery is changed after making the battery cover 7 open by rotating the battery cover 7 toward an arrow "b".

A volume control knob 8 and a switch knob 9 for switching a power supply and various functions are disposed on a surface of the case chassis 5, and these parts are connected to each switch part built in the case itself 4 through each wire passing through thickness of the case chassis 5. Furthermore, an adjustment cover 10 protecting an adjustment part that adjusts a band of the hearing aid sound and a maximum sound pressure level is pivotally joined to the surface of the case chassis 5 by making a pivot 11 as a rotation center.

Here, in the hearing aid 1, moisture invasion from each joint surface is protected by using seal packings, which have shapes suitable to each of joint surfaces, at a joint surface of the case itself 4 and case chassis 5 and at a joint surface of the case itself 4 and battery cover 7.

O-rings are used respectively between the volume control knob 8 and case chassis 5, and between the switch knob 9 and case chassis 5. Therefore, these O-rings prevent the moisture invasion from a gap between the volume control knob 8 and case chassis 5, and another gap between the switch knob 9 and case chassis 5.

A wind cover 12 is provided at the edge part of the case 2 so as to prevent a wind noise from invading into the microphone, and the wind cover 12, which is embedded with the case 2, is held between the hook 3 and case 2 by screwing the hook 3 onto the case itself 4. That is, the hearing aid 1 introduces external sound to an external sound inlet of the microphone through a notch (not shown) formed nearby the hook 3 of the wind cover 12.

Here, a suitable waterproof component such as a filter that passes sound through but does not pass moisture through is located at the external sound inlet of the microphone so that the waterproof component prevents moisture invasion to the microphone. In this manner, the hearing aid 1 can prevent beforehand moisture invasion into the case 2 by adopting waterproof sealing between components.

Recently, environmental destruction by mercury in abandoned batteries gets much attention so that air cells such as zinc-air cells, which use oxygen in the air as polarity recovery agent, are investigated also in the hearing aid field.

Since the air cells have not actually environmental problems in comparison with the mercury cells and their electric capacity is large, it is also possible to sufficiently use the air cells as power supply cells for common hearing aids.

However, generally speaking, an inside of a waterproof type of hearing aid is hermetically formed, as above described, so as to realize a waterproof function. Therefore, it is difficult to apply above-described air cells, which need oxygen so as to generate voltages, as power supply cells for such hearing aids.

As a means to solve this issue, Japanese Patent Application No. 2-125464 proposes to form a battery cover of a hearing aid as shown in FIG. 2.

That is, in a hearing aid 20, a knob container 21A comprising concave parts in predetermined depth is provided in the center part of the upper surface of the battery cover 21, and a knob 22 is rotationally mounted in the knob container 21A. In addition, the knob 22 is connected to a lock mechanism located inside the battery cover 21.

Thus, the battery cover 21 can be locked so as not to be detached from a hearing aid itself 23 by rotating the knob 22 for containing itself in the knob container 21A in a state where the battery cover 21 is set to the hearing aid itself 23. On the other hand, the battery cover 21 can be detached from the hearing aid itself 23 after unlocking through rotating the knob 22 like protruding the knob 22 outward from the state where the knob 22 is contained in the knob container 21A.

In addition, on the lower face of the battery cover 21, a circular side wall 21B is protrudingly formed for retaining the external circumference of the battery 24 in the battery compartment 23A of the hearing aid itself 23. Furthermore, since an O-ring composed of elastic material such as rubber material is attached as surrounding a base part of the side wall 21B, the battery cover 21 can be set in high close-coupling degree to the hearing aid itself 23.

In this case, a through-hole (not shown) is formed at the bottom of the knob container 21A in the battery cover 21, a filter 25 that passes air through but does not pass moisture through (hereinafter: a waterproof filter) is located so as to block the through-hole. Therefore, when the battery cover 21 is set to the hearing aid itself 23, this hearing aid can supply air in the knob container 21A in the battery cover 21 through the waterproof filter 25 into the battery compartment 23A in the hearing aid itself 23.

Thus, since this hearing aid 20 can supply air into the battery compartment without degrading of a waterproof characteristic, the air cell can be used as a power supply cell.

However, this type of hearing aid 20 has a problem that the waterproof filter 25 is slow-drying because, as above described, the through-hole is formed at the bottom of the knob container 21A and the knob 22 covers the waterproof filter 25 in use.

In this case, the wet waterproof filter 25 hardly passes air so that this type of hearing aid has a problem that it cannot supply sufficient oxygen to the air cell contained in the battery compartment 23A in the hearing aid itself 23.

Here, in the hearing aid 1, as shown in FIG. 3, the above-described seal packing 20, which is inserted between the case itself 4 and battery cover 7, is formed in a rectangular shape suitable to the above-described joint part 4A composed of the lower part of the case itself 4 (and the above-described joint part 7A composed of the edge of the side wall of the battery cover 7). Therefore, the seal packing is embedded with a slot (not shown) located at the joint 7A of the battery cover 7 so that the water proof can be realized.

In addition, in this hearing aid 1, after closing the battery cover 7 by rotating it toward the closing direction shown by an arrow "c", by locking the battery cover 7 so as not to open through rotating a lock knob 21 toward the lock direction shown by an arrow "d", the joint part 4A of the case itself 4 and the joint part 7A of the battery cover 7 can pinch and hold the seal packing 20. Accordingly, it is possible to prevent the moisture invasion from between the joint part 4A of the case itself 4 and the joint part 7A of the battery cover 7 into the inside of the case 2.

However, in the hearing aid 1 having such a constitution, the seal packing 20 is formed in a rectangular shape so that strength of a pinching force at a corner of joints against the seal packing 20 that is located between the joint part 4A of the case itself 4 and the joint part 7A of the battery cover 7 is minutely different from that at a side of the joints in a locked state of the battery cover 7. Therefore, this type of hearing aid has a problem that external moisture easily invade from a part having weaker pinching force against the seal packing 20 among the joint part 4A of the case itself 4 and the joint part 7A of the battery cover 7.

Furthermore, according to an embedding method of the battery cover 7 with the case itself 4 by setting a rotating shaft 6 as a rotation center, there is a limitation of the pinching force against the seal packing 20. Thus, it is possible to prevent moisture invasion if water drops such as sweat pour on. However, it is difficult to obtain the pinching force necessary to enable the hearing aid 1 to have the waterproof characteristic for use in a swimming pool, bath compartment, and the like where the waterproof characteristic is necessary.

As one of means to solve these problems, it is possible to form the battery cover separately from the case itself and to use an O-ring for the waterproof structure.

Since an O-ring has no corner, uniform pressure along the circumference can be easily given to the O-ring even if one of various methods such as a press fit method is applied as a setting method of the battery cover to the case itself. Therefore, it is possible to obtain highly reliable waterproof performance by composing the battery receiving chamber of the hearing aid.

However, since a user of a hearing aid is usually an aged person who is clumsy, it is problem in view point of using convenience to detach the battery cover against the elastic force of the O-ring when detaching the battery cover from the case itself, if the press fit method is applied as a setting method of the battery cover of the battery receiving chamber to the case itself.

In the hearing aid 1 having such a constitution, as shown in FIG. 4, a microphone 20 and an earphone 21 are contained in an edge portion of the inside of the case itself 4. Therefore, the case chassis 5 is divided from the case 2 by two surfaces perpendicular to the back surface of the case 2 and a curved surface approximately parallel to the back surface of the case 2. In addition, the case chassis 5 forms from the back-end of the microphone 20 to near the battery cover 7 in the back surface of the case 2. Thus, a joint part 22 of the case itself 4 and case chassis 5 is formed with two surfaces 22A and 22B perpendicular to the back surface of the case 2 and a curved surface 22C approximately parallel to the back surface of the case 2.

Therefore, as shown in FIG. 5, a seal packing 23 that is inserted to a joint part 22 of the case itself 4 and case chassis 5 corresponds to the shape of the circumference edge face of the opening 24 formed in the back surface of the case itself 4. Consequently, the seal packing 23 is composed of curved parts 23A and 23B and a first and second bent parts 23C and 23D formed at both edges of the curved parts 23A and 23B.

In this manner, the hearing aid 1 is assembled as a whole, as shown in FIG. 1 by screwing the case chassis 5 onto a fixture 26 located inside the case itself 4 after embedding this seal packing 23 with a slot 25 formed in the circumference edge face of the opening 24 in the case itself 4. Therefore, the hearing aid 1 can prevent moisture invasion into the inside of the case 2 from the joint part 22 by sealing the joint part 22 of the case itself 4 and case chassis 5 with a seal packing 23.

However, in the hearing aid 1 having this type of constitution, it is a problem that stress to the seal packing 23 inserted to the joint part 22 is biased when the case chassis 5 is closed. Thus, in the hearing aid 1, the case chassis 5 and case itself 4 are connected so as to put stress perpendicularly onto the case itself 4 from the case chassis 5. Therefore, although the curved parts 23A and 23B of the seal packing 23 can obtain sufficient stress, the bent parts 23C and 23D of the seal packing 23 have possibility not to obtain sufficient stress. If it happens, the hearing aid 1 cannot seal the surfaces 22A and 22B perpendicular to the back surface of the case 2 in the joint part 22 of the case itself 4 and case chassis 5 so that the hearing aid 1 is not sufficient as a waterproof type of hearing aid.

In addition, since the hearing aid 1 has a constitution where both ends of the seal packing 23 are bent, assembling operation is difficult and shaping of the seal packing 23 itself is difficult, too.

SUMMARY OF THE INVENTION

In view of the foregoing, an object of this invention is to provide a battery receiving chamber and a hearing aid using the battery receiving chamber that can supply practically sufficient air into the inside of the case and has a high waterproof characteristic.

The foregoing object and other objects of the invention have been achieved by the provision of a battery receiving chamber and a hearing aid using the battery receiving chamber, the hearing aid comprises: an air vent 42C with which a case 31 is provided; a waterproof means 70 that is located so as to block the air vent 42C, the waterproof means 70 for supplying air outside the case 31 through the air vent 42C to inside the case 31, and on the other hand, for preventing invasion of moisture which comes from outside the case 31 through the air vent 42C; and a slot 42E that is provided in one side face of the case 31 in which the air vent 42C is formed; wherein the slot 42E connects an end part of the side face of the case 31 to the air vent 42C.

The hearing aid is further characterized in that the case 31 includes a battery cover 42 forming a part of a side wall of a battery compartment 40A which is provided inside the case 31 and in which a battery is contained as a means for power supply, and the air vent 42C and the slot 42E are formed in the battery cover 42.

The waterproof externally worn hearing aid comprises: a concave part 42D formed in a side face of a case 31; an air vent 42C that is provided in a bottom face of the concave part 42D; and a waterproof means 70 that is located so as to block the air vent 42C, the waterproof means 70 for supplying air outside the case 31 through the air vent 42C to inside the case 31, and on the other hand, for preventing invasion of moisture which comes from outside the case 31 through the air vent 42C.

The hearing aid 30 has a slot 42E that is located in the side face of the case 31 and connects the concave part 42D to an end part of the side face.

The hearing aid is still more characterized in that the case 31 includes a battery cover 42 forming a part of a side wall of a battery compartment 40A which is provided inside the case 31 and in which a battery is contained as a means for power supply, and the concave part 42D and slot 42E are formed in the battery cover 42.

The hearing aid is further characterized in that the slot 42E is formed so that the slot 42E may extend downward when the hearing aid 30 is worn.

In a battery receiving chamber that blocks an opening of a battery compartment 40A, which is formed in the hearing aid itself 40, for attaching and detaching battery by using a battery cover 42 formed separately from the hearing aid itself 40, the battery receiving chamber comprises: first convex parts 40C and 40D that are located in an internal side face of the battery compartment 40A and have inclined surfaces 40CX and 40DX which become gradually higher toward the rotational direction in which a battery cover 42 is detached from the battery compartment 40A; second convex parts 42A and 42B that are located in the battery cover 42, correspond to the first convex parts 40C and 40D and have inclined surfaces 42AXA and 42BXA which become gradually higher toward the rotational direction in which a battery cover 42 is detached from the battery compartment 40A; and a waterproof means 45, which is inserted between the case itself 40 and battery cover 42, for preventing external moisture from a gap between the case itself 40 and battery cover 42 into the battery compartment 40A; and the battery cover 42 is gradually raised from the case itself 40 by sliding of the inclined surfaces 42AXA and 42BXA of the second convex parts 42A and 42B on the inclined surfaces 40CX and 40DX of the first convex parts 40C and 40D toward a higher place of the inclined surfaces 40CX and 40DX of the first convex parts 40C and 40D when the battery cover 42 is rotationally detached from the battery compartment 40A.

The battery receiving chamber further comprises: a third convex part 40B located in an external side face of the battery compartment 40A; a knob 71C that is located in a circumference edge face of an internal side face of the battery cover 42 and rotates along an external side face of the battery compartment 40A when the battery cover 42 is attached or detached; and a slot 71D that is located in correspondence to the third convex part 40B in a side face 71CB of the knob 71C opposite to the external side face of the battery compartment 40A, and has an inclined surface 71DX that becomes gradually lower toward the direction in which the battery cover 42 is embedded with the battery compartment 40A; and the battery cover 42 is depressively contacted to the case itself 40 by relative sliding of the third convex part 40B along the inclined surface 71DX when the battery cover 42 is rotationally attached.

The battery receiving chamber further comprises: a slot 41A that is located at a position which is a circumference side face forming an opening of the battery compartment 40A for attaching and detaching a battery and is approximately opposite to the third convex part 40B; and a fourth convex part 71E that is located at a position which is an external circumference surface of the battery cover 42 and is approximately opposite to the knob 71C; and the battery cover 42 is fixed to the case itself 40 by fitting of the fourth convex part 71E with the slot 41A when the third convex part 40B is embedded with a guide slot 71D in a predetermined position.

In a waterproof type of hearing aid 30 in which an earphone 62 and a microphone 60 are located at a tip of a case 31, the case 31 is divided into two pieces, a first and a second half-cases 40 and 41, and a waterproof component 44 is inserted into a joint part 100 of the first half-case 40 and second half-case 41, the case 31 is divided into two pieces by an approximately plane surface from an approximately center of the case 31 so that the earphone 62 may be located at a tip of the inside of the first half-case 40 and the microphone 60 may be located at a tip of the inside of the second half-case 41.

The hearing aid is furthermore characterized in that the first half-case 40 is the case itself 40 and the second half-case 41 is the case chassis 41.

The hearing aid is still characterized in that the joint part 100 of the first half-case 40 and second half-case 41 is formed by an approximately plane surface.

According to this invention, in the waterproof externally worn hearing aid, by locating the waterproof means so as to block the air vent 42C formed in the case 31 and by comprising the slot 42E connecting the end part of the case 31 and air vent 42C in the external side face of the case 31 where the air vent 42C is formed, air can be supplied into the air vent through the slot even if the side face of the case 31 where the air vent 42C is provided contacts to user's skin in use. Consequently, the hearing aid which can supply sufficient volume of air into the case and has high waterproof performance can be realized.

In addition, in the waterproof externally worn hearing aid, by forming the air vent 42C in the bottom of a concave part 42E formed in the external side face of the case 31 and by comprising the waterproof means so as to block the air vent 42C so that it is possible to prevent the air vent 42C from being blocked by the skin of the user when it is worn, the hearing aid which can supply sufficient volume of air into the case and has high waterproof performance can be realized.

Further, according to this invention, since the battery cover 42 is gradually raised from the case itself 40 by sliding of the inclined surfaces 42AXA and 42BXA of the second convex parts 42A and 42B on the inclined surfaces 40CX and 40DX of the first convex parts 40C and 40D toward a higher place of the inclined surfaces 40CX and 40DX of the first convex parts 40C and 40D when the battery cover 42 is rotationally detached from the battery compartment 40A, the battery cover 42 can be easily detached from the case itself 40.

Further, in the battery receiving chamber which blocks the opening, which is formed in the case itself, for attaching and detaching a battery in the battery compartment with the battery cover formed separately from the case itself, by forming the first convex part which is located in the internal side face of the battery compartment and has the inclined face which gradually rises toward the rotational direction in which the battery cover is detached from the battery compartment, and by forming the second convex part which corresponds to the first convex part, is located in the battery cover and has the inclined face which gradually rises toward the rotational direction in which the battery cover is detached from the battery compartment, and by inserting the waterproof means between the case itself and battery cover, detachment of the battery cover can become easy. Consequently, the battery receiving chamber which has good usage convenience and highly reliable waterproof performance can be realized.

Further, according to this invention, the joint part 100 between the first-half case 40 and the second-half case 41 can be arranged to be substantially flat by dividing the case 31 into two with a substantially flat plane from the substantially middle of the end of the case 31 in such a manner that the earphone 62 is located at the end within the first half-case 40 (case body), and the microphone 60 is located at the end within the second half-case 41. This allows it to apply stress without bias to the waterproof member inserted into the joint part 100 so that the joint part 100 between the first and second half-cases 40 and 41 can be surely sealed. Thus, it is possible to attain the hearing aid for which the waterproof performance can be further improved.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment (1-1) Whole Constitution of a Hearing Aid

Figure 6:
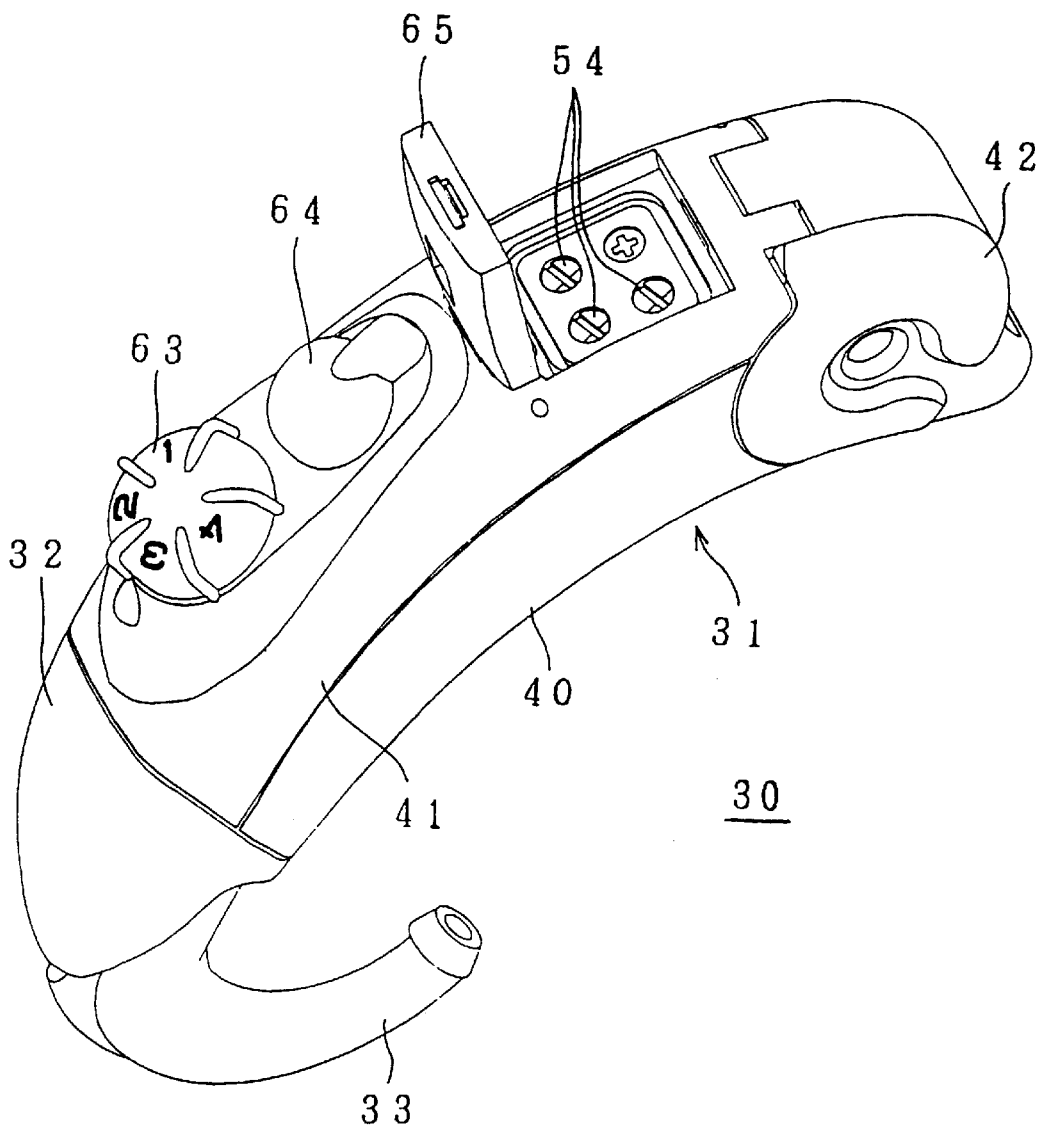
FIG. 6 is a perspective view showing the entire constitution of a hearing aid according to an embodiment.
Figure 7:
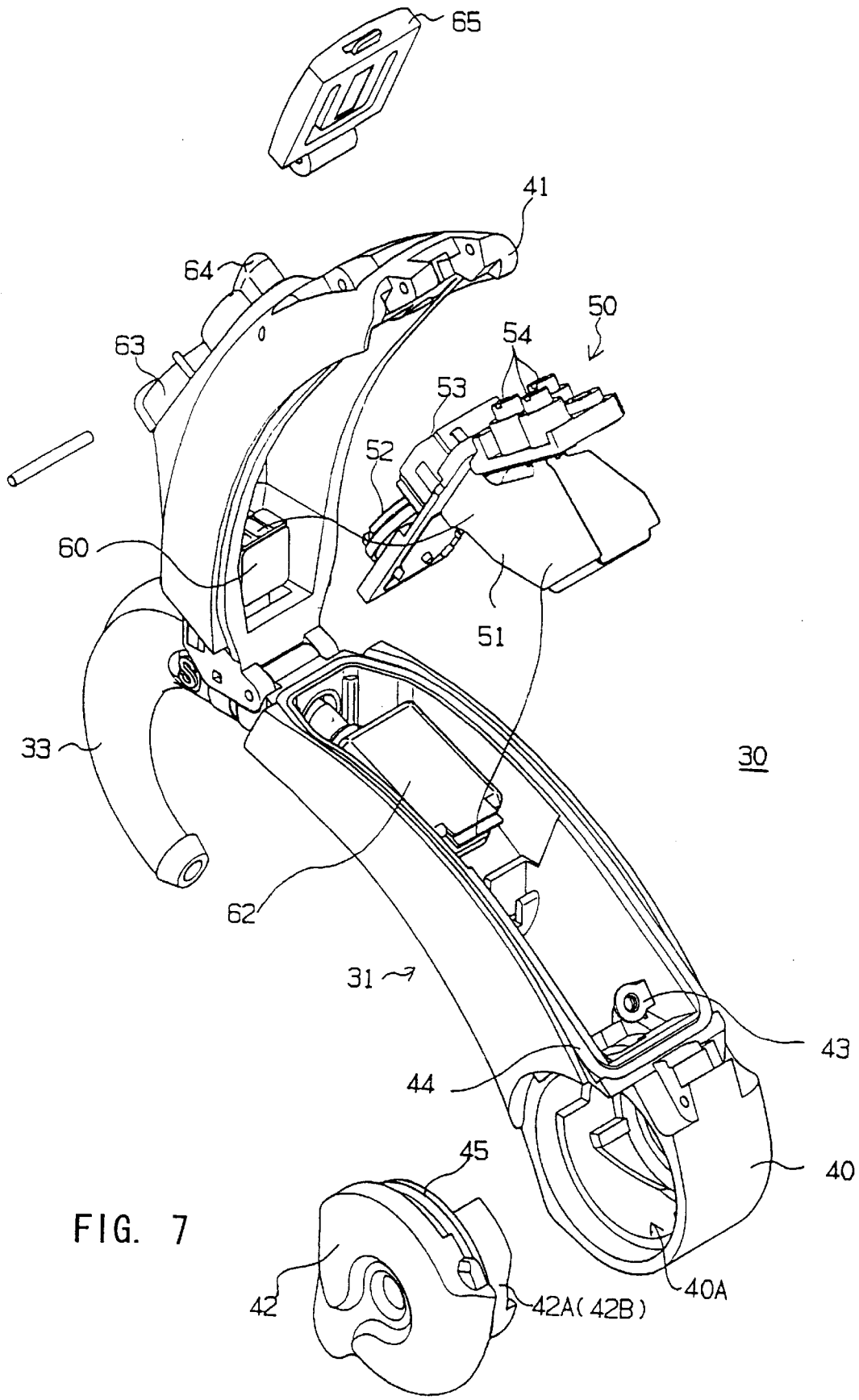
FIG. 7 is an exploded perspective view showing the entire constitution of a hearing aid according to an embodiment.

In FIGS. 6 and 7, the reference number 30 shows a waterproof externally worn hearing aid as a whole, a box-like case 31 composed with plastic resin is formed in an arch shape so as to fit to a shape of a back part of an earlobe at its end, a wind cover 32 and a hook 33 are integrally mounted.

The case 31, as is clear in FIG. 7, comprises: a case itself 40 forming an internal circumference part and a base part of the case 31; a case chassis 41 that is rotationally supported at a tip part of the case itself 40 and forms an external side face of the case 31; and a battery cover 42 blocking a cylindrical battery compartment 40A formed in a base part of the case itself 40. In addition, the case 31 is assembled as shown in FIG. 6 by screwing the case chassis 41 onto an end part of an electrode 43 protruding inside the case itself 40 and by setting the battery cover 42 like screwing into the case itself 40.

In this case, since a seal packing 44 composed of elastic material such as rubber material is inserted between the case itself 40 and case chassis 41, it is possible to prevent moisture from invading from a gap between the case itself 40 and case chassis 41 into the case 31.

Similarly, since an O-ring 45 composed of elastic material such as rubber material is inserted between the case itself 40 and battery cover 42, it is possible to prevent moisture from invading from a gap between the case itself 40 and battery cover 42 into the case 31.

The battery cover 42, as is clear in FIG. 7, has a pair of arc-shaped battery retaining walls 42A and 42B which are formed protrudingly toward the inside face, and retains a battery in a space surrounded by the battery retaining walls 42A and 42B.

Therefore, in this hearing aid 30, a battery can be charged in the battery compartment 40A by setting the battery cover 42 to the case itself 40 after a battery is embedded with the battery retaining space of the battery cover 42, so that a power can be supplied to a signal processing part 50 contained inside the case 31.

The signal processing part 50 is formed with a gain controller 52, a mode switch 53, and adjustment trimmer 54 on a flexible board 51 on which a hearing aid processing circuit is formed. Here, the signal processing part 50 performs hearing aid processing of sound signals supplied from the microphone 60 or an induction coil (not shown) in an input-output characteristic set by operation of the gain controller 52, mode switcher 53, adjustment trimmer 54 and electrode 55. Finally, the signal processing part 50 outputs the processed signals to the earphone 62. In this case, the gain controller 52 and mode switch 53 are connected through thickness of the case chassis 41 to a volume knob 63 and switch knob 64, which are located on an external side face of the case 31 which is composed of a curved surface of the case chassis 41, in high waterproof characteristic.

In the hearing aid 30, a sound pressure level of a hearing aid sound outputted from the earphone 62 can be controlled by rotationally operating the volume knob 63, and by operating the switch knob 64, the hearing aid 30 can be turned off or a mode of the hearing aid 30 can be changed.

In addition, the adjustment trimmer 54, as is clear in FIG. 6, is externally exposed to outside the case 31 through an opening for trimming (not shown) formed in an external circumference surface of the case 31. Therefore, a controller cover 65 is attached in free open/close to the external circumference surface of the case 31 so as to cover the adjustment trimmer 54 so that unintentional operation of the adjustment trimmer 54 can be prevented.

In addition, the induction coil is located inside the flexible board 51 which is cylindrically curled so that a space inside the case 31 can be used effectively.

The microphone 60 is attached to an tip of the inside of the case chassis 41.

At the tip of the inside of the case chassis 41, a waterproof component (not shown) is attached so as to prevent moisture invasion through the tip of the inside of the case chassis 41 into the case 31.

Furthermore, the earphone 62 is located at a tip of an inside of the case itself 40 so that hearing aid sound based on an output from the hearing aid processing circuit in the signal processing part 50 can be outputted through the hook 33 to the outside of the hearing aid 30.

(1-2) Constitution of a Battery Cover

Figure 8:
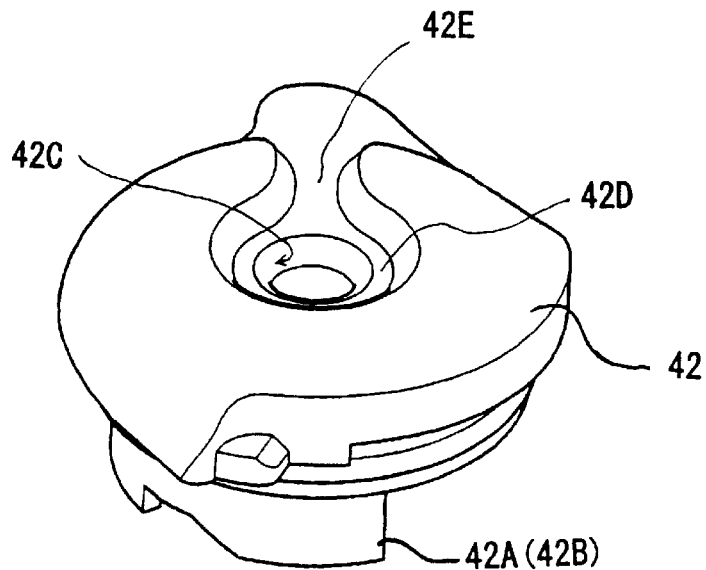
FIG. 8 is a perspective view showing an external side face of a battery cover.

As is clear in FIG. 8, an air vent 42C is located in a central part of the external side face of the battery cover 42 so as to communicate the outside of the case 31 with the battery compartment 40A.

Therefore, in this hearing aid 30, air outside the case 31 can be supplied to a battery contained inside the battery compartment 40A through the air vent 42C so that an air cell can be used besides a mercury cell.

Figure 9:
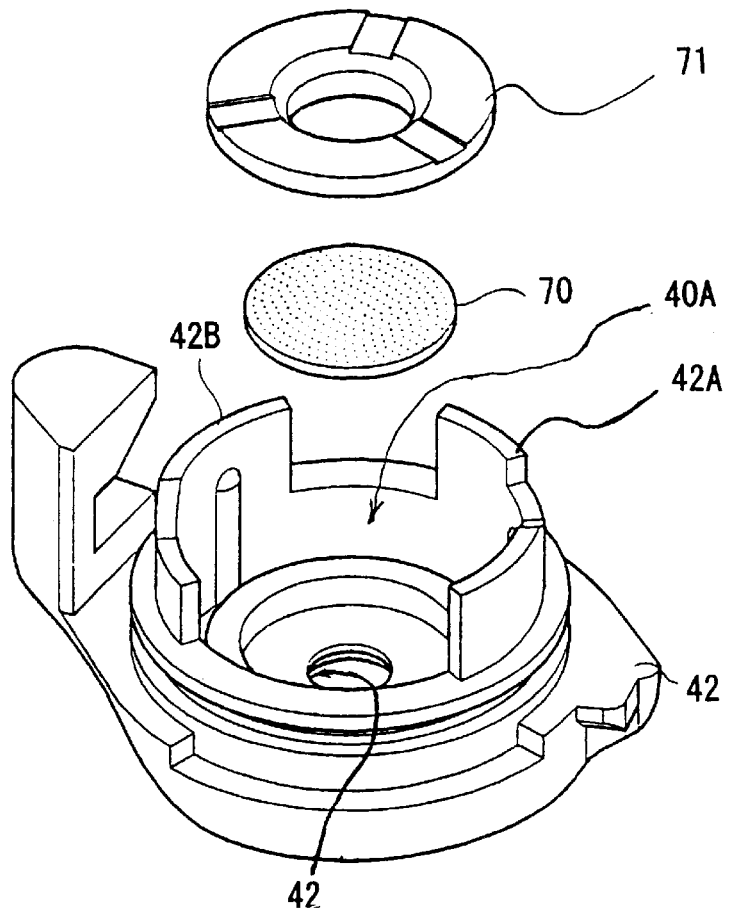
FIG. 9 is an exploded perspective view showing an inside of a battery cover.

In addition, as shown in FIG. 9, a waterproof filter 70 is fixed with a ring-shaped clamp component 71 so as to block the air vent 42C from the inside of the battery cover 42 so that air can be supplied into the battery compartment 40A and moisture outside the case 31 can be prevented from invading through the air vent 42C into the battery cover 40A.

Furthermore, as is clear in FIG. 8, a concave part 42D is formed along the surroundings of the air vent 42C in the external side face of the battery cover 42, and a slot 42E is also formed from the concave part 42D to the edge of the external side face of the battery cover 42. Therefore, air can be supplied through the slot 42E, concave part 42D, and air vent 42C into the battery compartment 40A in the case 31 even if this hearing aid 30 is used so that the battery cover 42 may directly contact to user's skin.

In this embodiment, the slot 42E is formed so that the slot 42E may extend downward from the concave part 42D when the hearing aid 30 is worn. Therefore, even if moisture such as user's sweat flows into the concave part 42D, this moisture can be naturally dropped and drained immediately toward outside the concave part 42D by using the slot 42E as a guide.

In addition, in this embodiment, a thicker one among materials (for example, Goatex (trademark-Japan Goatex Co., Ltd.)) that water repellent materials are formed in continuous porous fibers is used as a waterproof filter 70.

Thus, in the hearing aid 30, the waterproof filter 70 can be cleaned with a swab when it becomes necessary.

(1-3) Operation of the Embodiment

In this hearing aid 30, the waterproof filter 70 is easily dried because the air vent 42C is provided so as to expose on the surface of the case 31, and hence, sufficient air can be always supplied to the battery compartment 40A in the case 31.

In this case, the slot 42E communicating the air vent 42C with the edge of the side face of the battery cover 42 is formed downward on the surface of the case 31. Therefore, even if the battery cover 42 is set so as to directly contact to user's skin, air can be securely supplied through this slot 42E to the air vent 42C.

In addition, since, in this hearing aid 30, the concave part 42D is formed around the air vent 42C, the air vent 42C cannot be easily blocked by user's skin even if the battery cover 42 is set so as to directly contact to user's skin, and hence, air can be securely supplied.

(1-4) Advantages of the Embodiment

The air vent 42C opening into the battery compartment 40A in the case 31 is located in the battery cover 42, the waterproof filter 70 is located in the internal side face of the battery cover 42 so as to cover the air vent from inside, and the slot 42E connecting the air vent 42C and the external side face of the battery cover 42 is formed on the surface of the battery cover 42. Therefore, even if the battery cover 42 is set so as to directly contact to user's skin, sufficient volume of air can be supplied into the battery compartment 40A in the case 31 through the slot 42E and air vent 42C so that the hearing aid that can supply sufficient volume of air into the case 31 and has high waterproof characteristic can be realized. Furthermore, moisture such as sweat can be drained through this slot 42E.

In addition, the concave part 42D is located in the external side face of the battery cover 42, the air vent 42C communication with the battery compartment 40A is formed in the bottom of the concave part 42D, and the waterproof filter is located in the internal side face of the battery cover 42 so as to cover the air vent from inside. Therefore, even if the battery cover 42 is set so as to directly contact to user's skin, the air vent cannot be easily blocked by the user's skin so that the hearing aid that can supply sufficient volume of air into the case 31 and has high waterproof characteristic can be realized. In addition, since the air vent 42C is formed in the concave part 42D, unintentional external force cannot break the waterproof filter 70 located in the air vent.

(1-5) Other Embodiment

In the above described embodiment, the case that the air vent 42C is formed in the side face of the battery cover 42 is described, but the present invention is not limited to this. The air vent 42C may be formed anywhere in the case 31. In this case, similar advantages can be obtained if the slot 42E and concave part 42D are formed in the case 31 similarly to the embodiment.

In addition, in the above described embodiment, the case that the waterproof filter 70 is attached to the internal side face of the battery cover 42 is described, the present invention is not limited to this. It is possible to attach the waterproof filter 70 to the external side face of the battery cover 42 after forming the depth of the concave part 42D of the battery cover 42 deeper than thickness of the waterproof filter 70.

Furthermore, in the above described embodiment, the case that the slot 42E in the battery cover 42 is formed so that the slot 42D may extend downward from the concave part 42D when this hearing aid 30 is worn, is described, but the present invention is not limited to this. It is good so long as the moisture flowing into the concave part 42D can be drained to the outside of the concave part 42D. Therefore, the direction is not limited to the just down direction, but it is sufficient so long as the down slope is in the level as natural drop of the moisture is possible.

Still more, in the above described embodiment, the case that the waterproof filter 70 is used as a means for preventing the moisture outside the case 31 from invading through the air vent in the battery cover 42 into inside the case 31 is described, but the present invention is not limited to this. It is possible to use other waterproof means.

(2) Second Embodiment (2-1) Constitution of a Battery Receiving Chamber

Figure 10:
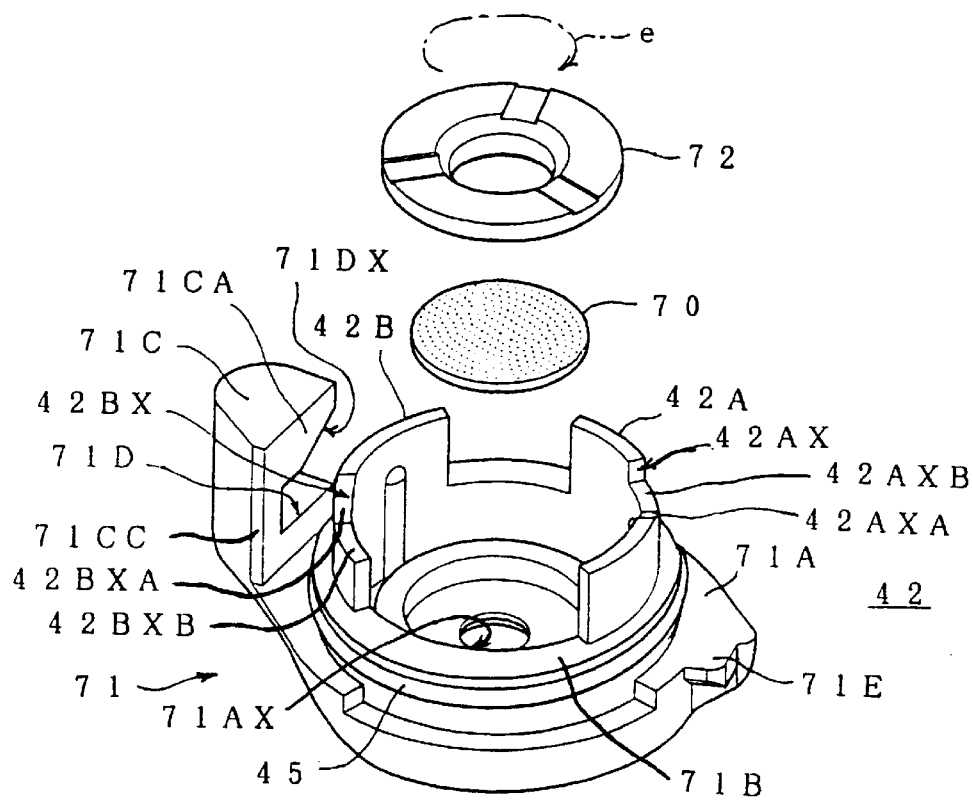
FIG. 10 is an exploded perspective view showing constitution of a battery cover.
Figure 11:
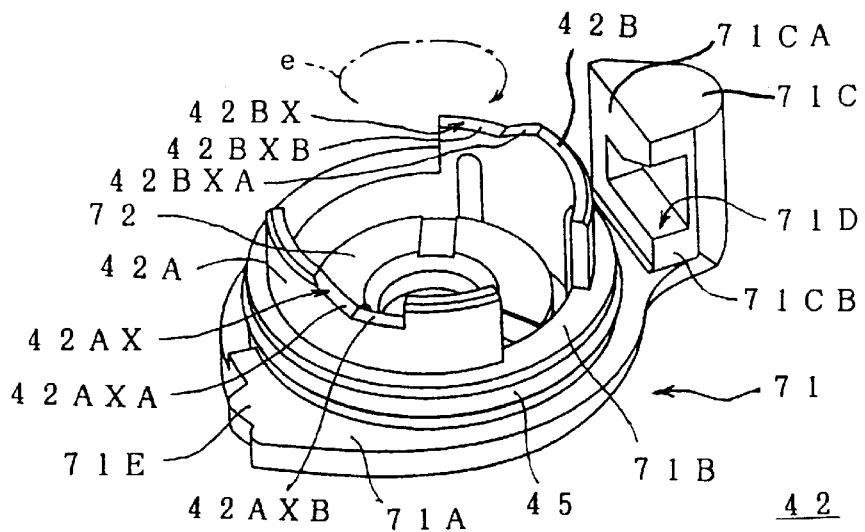
FIG. 11 is a perspective view showing the constitution of a battery cover.

The battery cover 42 forming a part of a battery receiving chamber in this hearing aid 30, as shown in FIGS. 10 and 11, comprises the battery cover itself 71, disc-shaped waterproof filter 70, and ring-shaped filter clamp 72.

In this case, a ring-shaped convex part 71B is formed in an inside of a approximately disc-shaped base part 71A forming the external side face of the battery cover itself 71, and the above-described battery retaining walls 42A and 42B are located in the end surface of the ring-shaped convex part 71B.

In addition, a slot (not shown) is provided along circumference of the external side face of the ring-shaped convex part 71B, and the above-described O-ring 45 is embedded with this slot.

Furthermore, since the air vent 71AX communicating the outside of the case 31 with the battery compartment 40A is provided in a central part of the base part 71A surrounded with the ring-shaped convex part 71B, external air can be supplied into the battery compartment 40A through the air vent 71AX even if the battery cover 42 is set to the case itself 40. Therefore, in this hearing aid 30, an air cell besides a mercury cell can be used as a power supply cell.

The waterproof filter 70 is fixed with the filter clamp 72 in a center part of the inside of the base part 71A surrounded by the ring-shaped concave part 71B as if the waterproof filter 70 blocked the air vent 71AX. Therefore, external air can be supplied into the case 31 through the air vent 71AX, and on the other hand, moisture invasion into the case 31 can be prevented.

In addition, an approximately triangle-pole-shaped knob 71C is protrudingly formed in a part of the internal circumference edge part of the base part 71A so that the knob 71C may be positioned against the ring-shaped convex part 71B and battery retaining wall 42B in the distance nearly equal to the thickness of the circumference side wall of the battery compartment 40A in the case itself 40. Thus, the battery cover 42 can be easily rotated with the knob 71C in a desired direction after the battery cover 42 is put on the battery compartment 40A in the case itself 40.

In this case, a guide slot 71D is provided in one side face 71CA (hereinafter: the internal side face 71CA) of the knob 71C opposite to the ring-shaped convex part 71B and battery retaining wall 42B so that the guide slot 71D may reach to nearby the end part of the side face 71CC facing to the detachment direction opposite to the attachment rotational direction from the end part of the side face 71CB (hereinafter: the face 71CB opposite to the attachment rotational direction) which is shown by the arrow "e".

In the guide slot 71D, the side face 71DX (hereinafter: the taper face) is formed in taper so that the slot width may increase as the edge of the face 71CB of the knob 71C becomes near from its center part.

Figure 12:
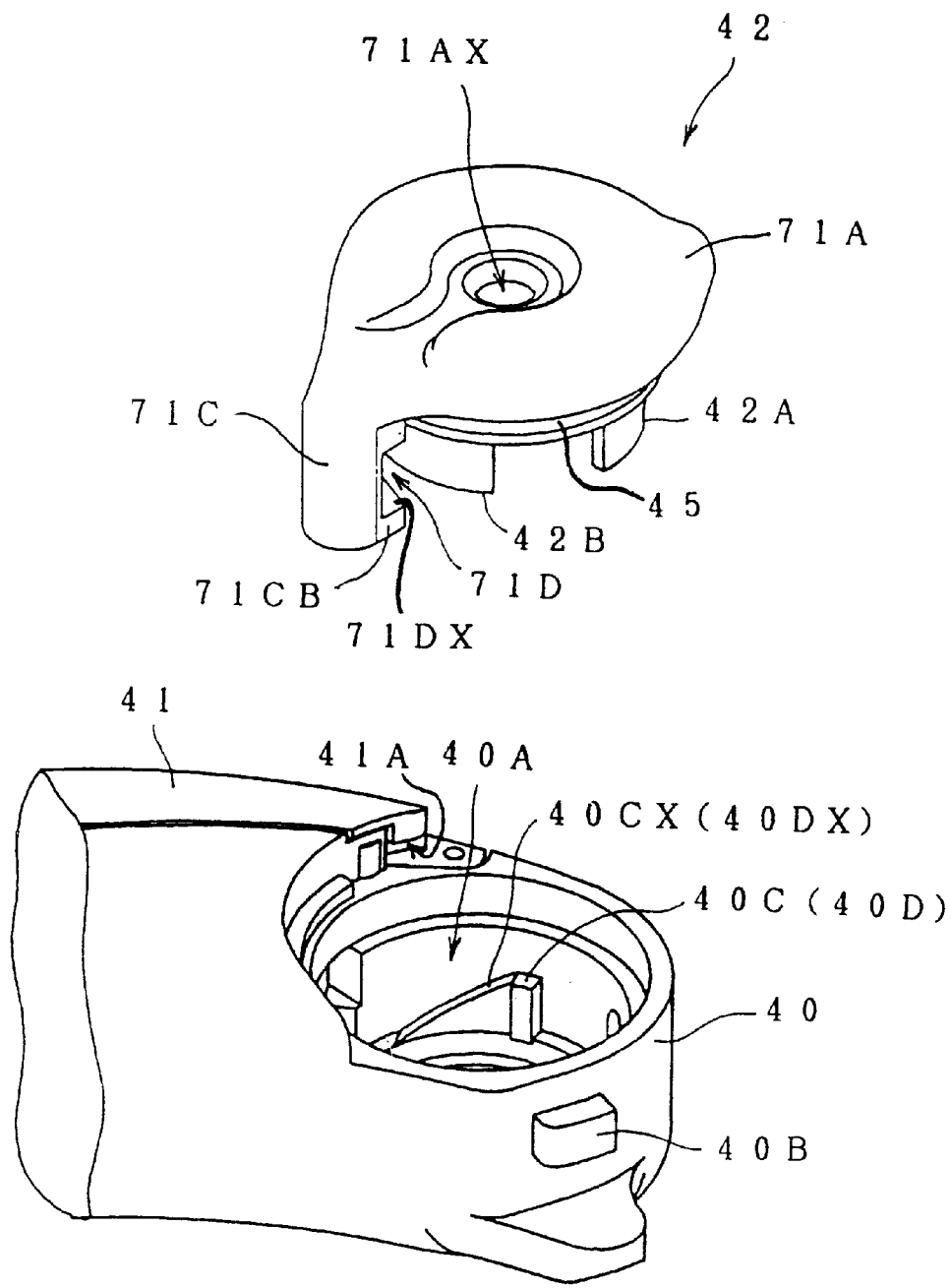
FIG. 12 is an exploded perspective view showing constitution of a battery receiving chamber.
Figure 13A:
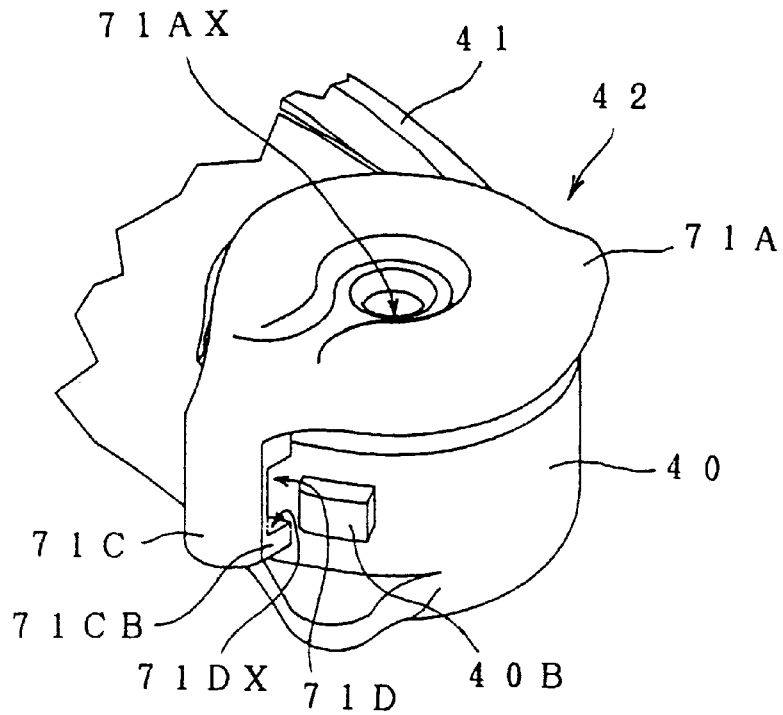
FIGS. 13A and 13B are a perspective view and a sectional view respectively for explanation of attachment and detachment of a battery cover to a case itself.
Figure 14A:
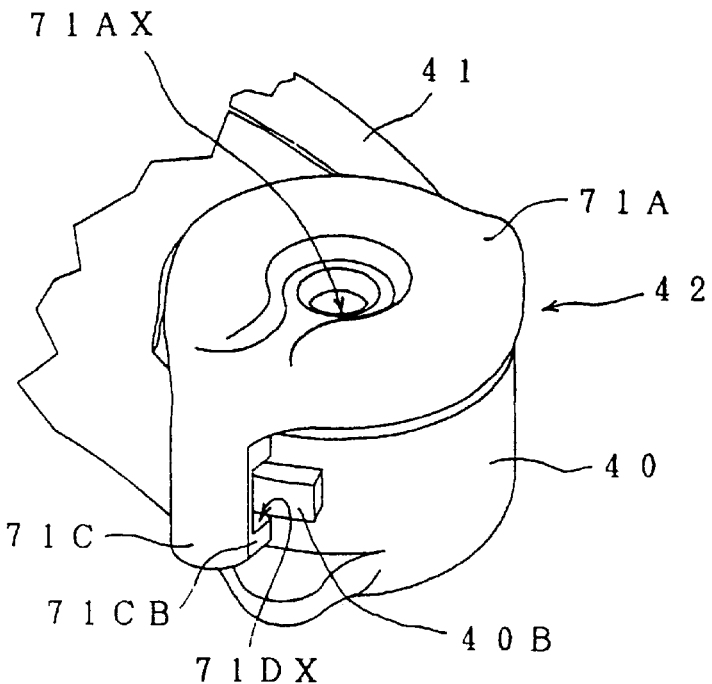
FIGS. 14A and 14B are a perspective view and a sectional view respectively for explanation of attachment and detachment of a battery cover to a case itself.
Figure 15:
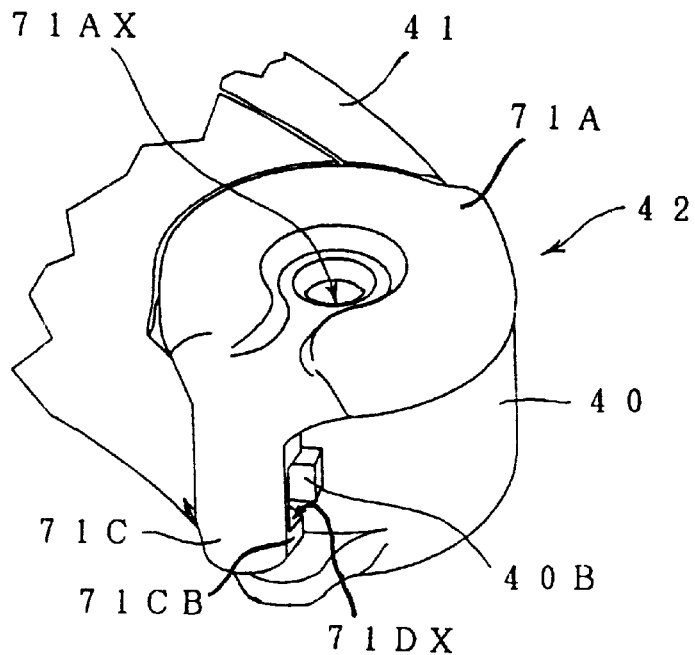
FIGS. 15A and 15B are a perspective view and a sectional view respectively for explanation of attachment and detachment of a battery cover to a case itself.
Figure 15:
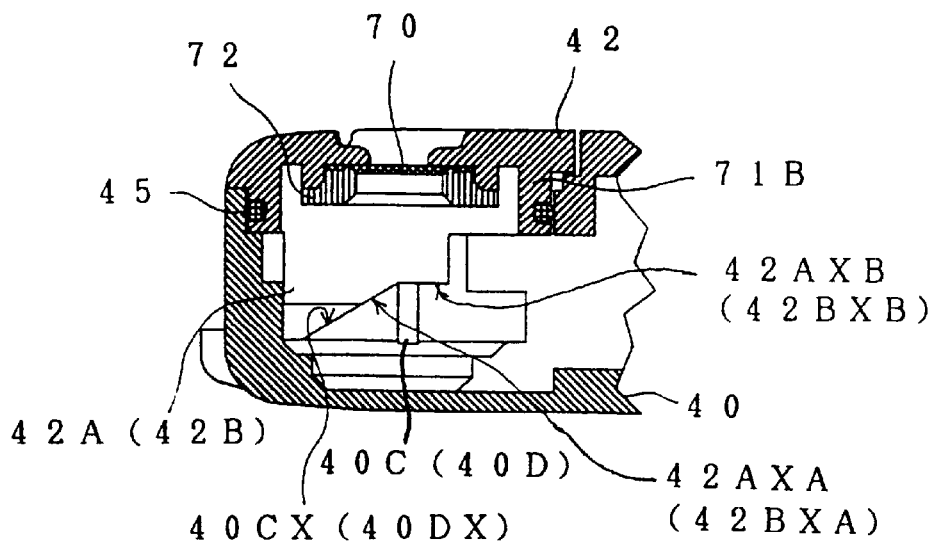

In addition, as shown in FIG. 12, a clamp convex part 40B is provided at the position corresponding to the guide slot 71D of the battery cover 42 in the external circumference of the surrounding wall of the battery compartment 40A in the case itself 40. In this hearing aid 30, as shown in FIG. 13A, the battery cover 42 is put on the battery compartment 40A in the case itself 40 so that the clamp convex part 40B may position against the guide slot 71DX of the battery cover 42 in the attachment rotational direction. After that, as shown in FIG. 14A and FIG. 15A, by rotating the battery cover 42 in the attachment rotational direction, the clamp convex part 40B of the case itself 40 can relatively slide on the taper face 71DX along the taper face 71DX of the guide slot 71D in the battery cover 42.

In this case, the clamp convex part 40B of the case itself 40 relatively slides on the taper face 71DX as the clamp convex part 40B gives the taper face 71DX of the guide slot 71D in the battery cover 42 a force acting to the tip direction of the knob 71C.

Therefore, this hearing aid 30, by rotating the battery cover 42 from the state shown in FIG. 13A in the attachment rotational direction, can give the battery cover 42 a clamping force with which the battery cover 42 is closely contacted to the case itself 40. Consequently, the O-ring 45 is embedded the battery cover 42 with the case itself 40 so as to close-couple the battery cover 42 with the upper end part of the inside wall face of the battery compartment 40A in the case itself 40.

In this case, a locking convex part 71E is provided in the circumference edge part of the base part 71A opposite to the knob 71C of the battery cover 42 through the air vent 71AX, and a locking notch slot 41A is formed in the lower edge part of the case chassis 41 so that the locking notch slot 41A may be opposite to the clamp convex part 40B in the case itself 40 through the battery compartment 40A in correspondence to the locking convex part 71E of the battery cover 42.

Figure 16A:
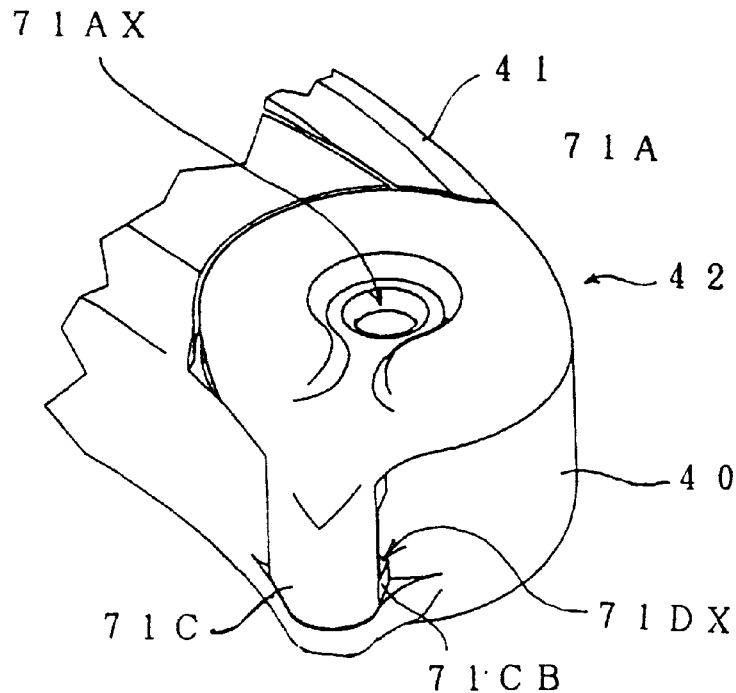
FIGS. 16A and 16B are a perspective view and a sectional view respectively for explanation of attachment and detachment of a battery cover to a case itself.

In this hearing aid 30, the locking convex part 71E can be embedded with the locking notch slot 41A when the clamp convex part 40B is completely embedded with the deepest part of the guide slot 71D in the battery cover 42 as shown in FIG. 16A by rotating the battery cover 42 further from the state shown in FIG. 15A toward the attachment rotational direction. Thus, the battery cover 42 can be locked in close coupling with the case itself 40.

In addition to above constitution, in this embodiment, as shown in FIGS. 10 and 11, notches 42AX and 42BX having inclined surfaces 42AXA and 42BXA (hereinafter: inclined surfaces 42AXA and 42BXA of the battery cover side) respectively, whose height from the base part 71A gradually increase toward the attachment rotational direction, are formed at the predetermined positions in the end parts of the battery retaining walls 42A and 42B of the battery cover 42.

Figure 17:
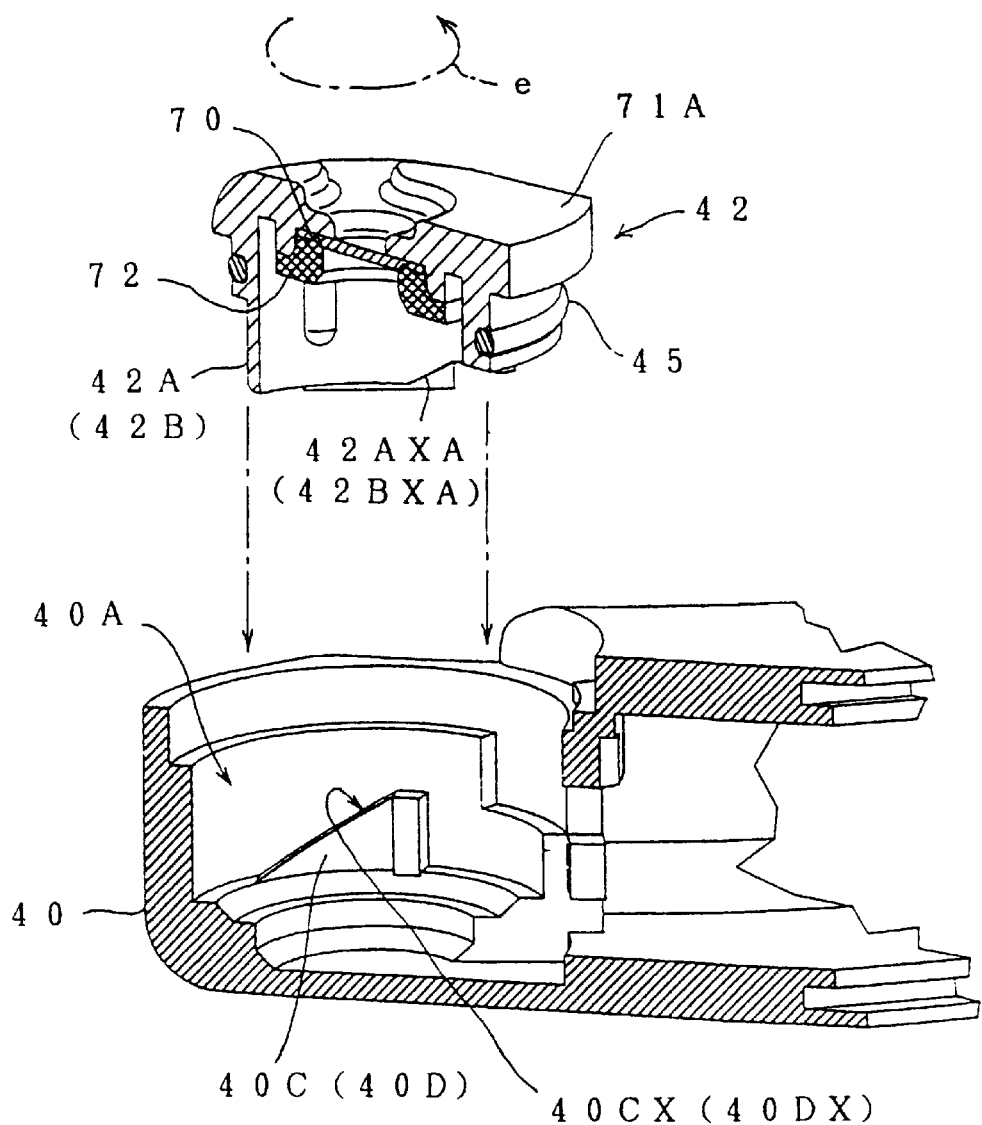
FIG. 17 is a sectional view for explanation of an inside of a battery compartment in a case itself.

As shown in FIGS. 12 and 17, inside the battery compartment 40A in the case itself 40, a pair of cams 40C and 40D having inclined surfaces 40CX and 40DX (hereinafter: inclined surfaces 40CX and 40DX of the case side) respectively, which correspond to the formed positions and the inclination angle of the respective inclined surfaces 42AXA and 42BXA of the battery cover side and whose height from the bottom of the battery compartment 40A gradually decrease toward the attachment rotational direction, are formed in the positions mutually opposite by making the center shaft of the battery compartment 40A as a center.

Figure 13B:
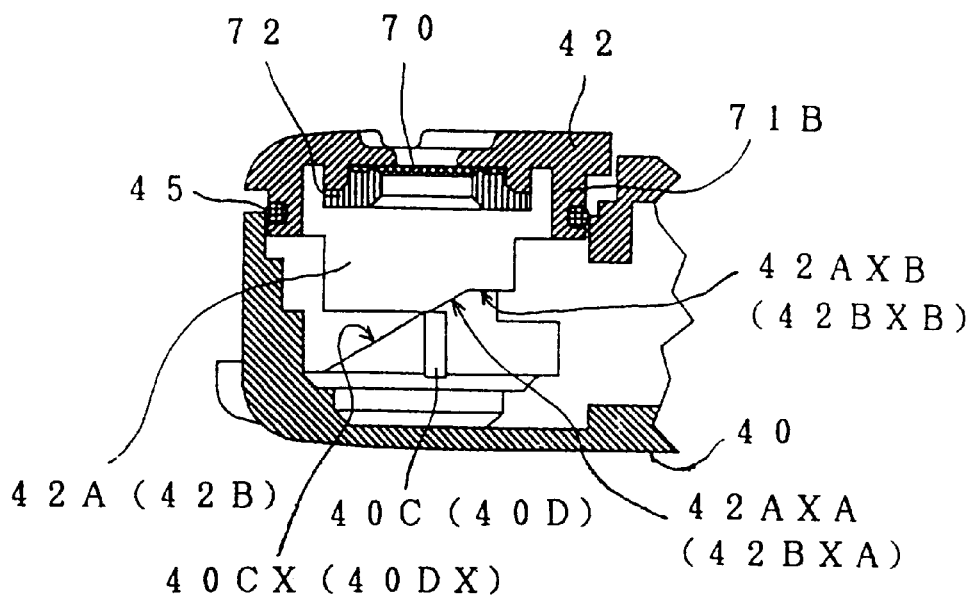

Practically, each of cams 40C and 40D is formed at each of positions, where, as shown in FIG. 13B, the inclined surfaces 42AXA and 42BXA of the battery cover side contact to the inclined surfaces 40CX and 40DX of the case side, when the clamp convex part 40B in the case itself 40 is in the state where the clamp convex part 40B positions toward the attachment rotational direction before embedding with the guide slot 71D in the battery cover 42.

Therefore, in this hearing aid 30, when the battery cover 42 is attached to the case itself 40 by rotating the battery cover 42 toward the attachment rotational direction, none interrupts movement of the battery cover 42 which is pressed to the case itself 40 by the clamping force given by the clamp convex part 40B in the case itself 40. On the other hand, when the battery cover 42 is detached from the case itself 40 by rotating the battery cover 42 toward the detachment rotational direction, the battery cover 42 can be gradually raised as sliding in parallel to the central axis of the O-ring 45 since the inclined surfaces 42AXA and 42BXA of the battery cover side slide as gradual raise along the inclined surfaces 40CX and 40DX of the case side.

In this case, as shown FIGS. 10 and 11, lower surfaces 42AXB and 42BXB of the notches 42AX and 42BY adjacent respectively to the inclined surfaces 42AXA and 42BXA of the battery cover side are formed in parallel to the inside surface of the case part 71A as same as the end part of the battery retaining walls 42A and 42B.

In addition, as shown in FIGS. 15A and 15B, the depth of the notches 42AX and 42BX is selected so that the end parts of the cams 40C and 40D contact respectively to the lowest faces 42AXB and 42BXB when the end of the clamp convex part 40B in the case itself 40 reaches to the deepest part of the taper face 71D of the battery cover 42.

Therefore, in this hearing aid 30, after the end of the clamp convex part 40B in the case itself 40 reaches to the taper face 71DX in the battery cover 42 when the battery cover 42 is put on the case itself 40 by rotating the battery cover 42 toward the attachment rotational direction, the ends of the cams 40C and 40D in the case itself 40 each relatively slide and support the lowest faces 42AXB and 42BXB of the notches 42AX and 42BX in the battery cover 42. Thus, the battery cover 42 cannot be embedded in more than this depth with the battery compartment 40A in the case itself 40. Consequently, in the hearing aid 30, by rotating the battery cover 42 in this depth, the clamp convex part 40B in the case itself 40 is smoothly embedded with the deepest part of the guide slot 71D in the battery cover 42, and hence, the hearing aid 30 can prevent unintentional release of the clamp convex part 40B in the case itself 40 from the guide slot 71D in the battery cover 42 as shown in FIGS. 13A and 13B.

(2-2) Operation of the Embodiment

In the above constitution, in the state that the battery cover 42 is put on the battery compartment 40A in the case itself 40 so that the clamp convex part 40B in the case itself 40 may position toward the attachment rotational direction against the guide slot 71D in the battery cover 42 and so that the inclined surfaces 42AXA and 42BXA of the battery cover side contact to the inclined surfaces 40CX and 40DX of the case side, the ends of the cams 40C and 40D in the case itself 40 contact to and are supported by the ends of the battery retaining walls 42A and 42B in the battery cover 42. Thus, the battery cover 42 is kept in the floating state, not in the embedded state with the upper end of the inside wall face of the battery compartment 40A in the case itself 40.

Figure 14B:
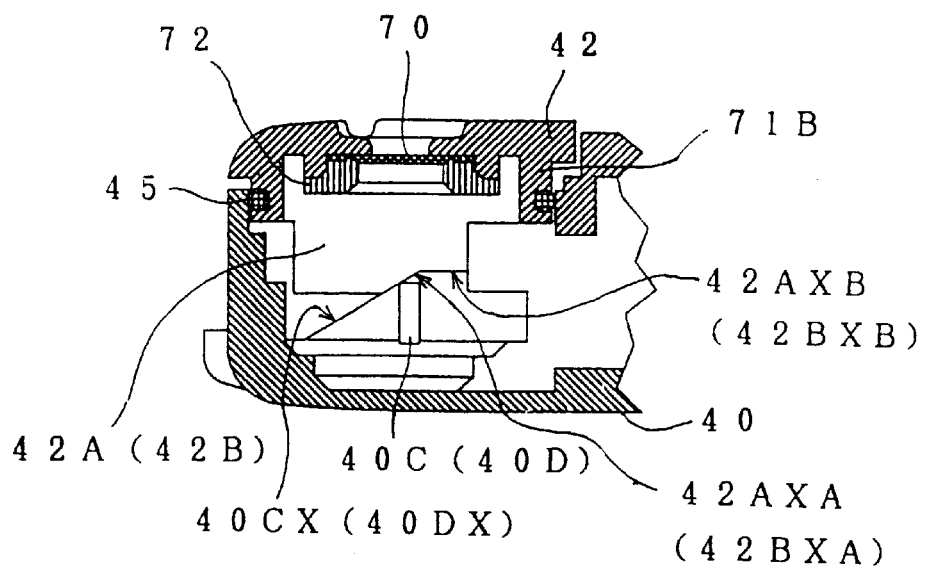

If the battery cover 42 is rotated from this state toward the attachment rotational direction, the inclined surfaces 42AXA and 42BXA of the battery cover side start to contact to the inclined surfaces 40CX and 40DX of the case side, and after that, the clamp convex part 40B in the case itself 40 is embedded with the guide slot 71D as shown in FIGS. 14A and 14B. Then, the battery cover 42 is pressed to the battery compartment 40A in the case itself 40 in the basis of the clamping force given by the clamp convex part 40B in the case itself 40 in correspondence to its rotation amount, and is embedded. In this time, the inclined surfaces 42AXA and 42BXA of the battery cover side in the battery cover 42 slide on the inclined surfaces 40CX and 40DX of the case side in the case itself 40, and lower toward the battery compartment 40A in the case itself 40 along the inclined surfaces 40CX and 40DX of the case side.

Figure 16B:
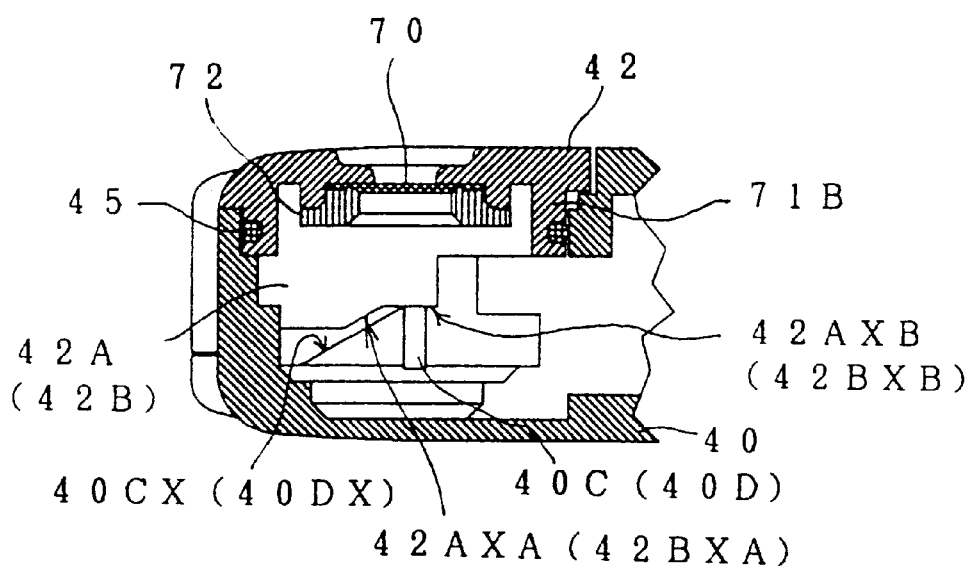

The battery cover 42 is further rotated, and the ends of the cams 40C and 40D in the case itself 40 contact to the lowest faces 42AXB and 42BXB of the notches 42AX and 42BX in the battery cover 42. After that, the ends of the cams 40C and 40D in the case itself 40 relatively slide on and support the lowest faces 42AXB and 42BXB of the notches 42AX and 42BX in the battery cover 42, and hence, the battery cover 42 does not push into the battery compartment 40A in the case itself 40 in more than this depth and rotates. After this, the clamp convex part 40B in the case itself 40 is embedded with the deepest part of the guide slot 71D in the battery cover 42, the locking convex part 71E in the battery cover 42 is embedded with the locking hole 41A in the case chassis 41, and hence, the battery cover 42 is locked as shown in FIGS. 16A and 16B.

On the other hand, if the battery cover 42 is rotated toward the detachment rotational direction, the clamp convex part 40B in the case itself 40 is released from the deepest part of the guide slot 71D in the battery cover 42, the locking convex part 71E in the battery cover 42 is released from the locking hole 41A in the case chassis 41, and hence, the battery cover 42 is unlocked. After that, until the inclined surfaces 42AXA and 42BXA of the battery cover side contact to the inclined surfaces 40CX and 40DX of the case side (in this case, the end of the clamp convex part 40B in the case itself 40 reaches to the deepest part of the taper face 71DX of the guide slot 71D in the battery cover 42 as shown in FIGS. 15A and 15B), the battery cover 42 is rotated in the state depressed to the case itself 40.

After the inclined surfaces 42AXA and 42BXA of the battery cover side in the battery cover 42 contact to the inclined surfaces 40CX and 40DX of the case side in the case itself 40, the inclined surfaces 42AXA and 42BXA of the battery cover side in the battery cover 42 slide on the inclined surfaces 40CX and 40DX of the case side so as to rise toward the end of the cams 40C and 40D in the case itself 40 along the inclined surfaces 40CX and 40DX of the case side. In addition, since the clamp convex part 40B in the case itself 40 slides on the taper face 71DX of the guide slot 71D in the battery cover 42 so as to slip out of the taper face 71DX of the guide slot 71D, the battery cover 42 gradually rises from the case itself 40 toward the central axis of the O-ring 45 as shown in FIGS. 14A and 14B.

This gradual rise of the battery cover 42 continues until the ends of the inclined surfaces 42AXA and 42BXA of the battery cover side in the battery cover 42 are off from the ends of the inclined surfaces 40CX and 40DX of the case side in the case itself 40 as shown in FIGS. 13A and 13B after the clamp convex part 40B in the case itself 40 is off from the guide slot 71D in the battery cover 42. After that, the ends of the cams 40C and 40D in the case itself 40 slide on and support the battery retaining walls 42A and 42B in the battery cover 42, and hence, the battery cover 42 is kept in the state floating from the case itself 40.

Therefore, in this hearing aid 30, when the battery cover 42 is detached, the battery cover 42 gradually rises from the case itself 40 toward the central axis of the O-ring 45 so long as the battery cover 42 is rotated at a small angle toward the detachment rotational direction. Accordingly, since the battery cover 42, which is upper than the O-ring 45, floats from the battery compartment 40A, for example, even an aged person who is awkward can attach and detach the battery cover 42.

In addition, in this hearing aid 30, since the O-ring is used as a waterproof seal between the battery cover 42 and case itself 40, waterproof performance can be increased.

(2-3) Advantage of the Embodiment

According to the above constitution, the cams 40C and 40D having the inclined surfaces 40CX and 40DX of the case side is formed inside the battery compartment 40A in the case itself 40, and corresponding to this, the inclined surfaces 42AXA and 42BXA of the battery cover side are formed in the battery retaining walls 42A and 42B of the battery cover 42. Therefore, even if the O-ring is used as a waterproof seal, this hearing aid can realize the battery receiving chamber having advantages of easy detaching and attaching of the battery cover 42, good usage convenience, and highly reliable waterproof performance.

(2-4) Other Embodiment

In the above embodiment, the case that two cams 40C and 40D are formed in the battery compartment 40A side in the case itself 40, and corresponding to this, the notches 42AX and 42BX are formed in the battery retaining walls 42A and 42B of the battery cover 42 is described, but the present invention is not limited to this. It is also possible that the number of the cams 40C and 40D and the notches 42AX and 42BX, corresponding to the cams, in the battery cover 42 is besides 2, for example, 1 or more than 3.

In addition, in the above embodiment, the case that the notch slot 71D is formed in the internal side face 71CA of the knob 71C and the clamp convex part 40B is formed on the external circumference face of the lowest end of the case itself 40 in correspondence to the notches 71D is described, but present invention is not limited to this. It is also possible that a convex part is formed on the internal side face 71CA of the knob 71C, and a notch having a taper part or an inclined angle is formed in the base part, corresponding to the convex part, of the case itself 40.

Furthermore, in the above embodiment, the case that the O-ring is used as a waterproof means between the battery cover 42 and case itself 40, but the present invention is not limited to this. It is also possible to apply a waterproof component formed of elastic material whose sectional form is not round, for example, home-base-shaped.

Still more, in the above embodiment, the case that, by forming the notches 42AX and 42BX in the battery retaining walls 42A and 42B of the battery cover 42, the inclined surfaces 42AXA and 42BXA of the battery cover side is formed in the battery cover 42, but the present invention is not limited to this. For example, it is also possible that, without forming the battery retaining walls 42A and 42B in the battery cover 42, a slim and long plate-like convex part is formed, and an inclined face of the battery cover 42 side is formed by making the end part of the concave part taper-shaped. Besides this, various methods can be applied as methods for forming the inclined face in the battery cover side.

In addition, in the above embodiment, the case that the present invention is applied to the hearing aid 30, but the present invention is not limited to this. For example, the present invention can be also applied to the other electronic equipment such as a radio using a battery.

(3) Third Embodiment (3-1) Constitution of the Case

Figure 18:
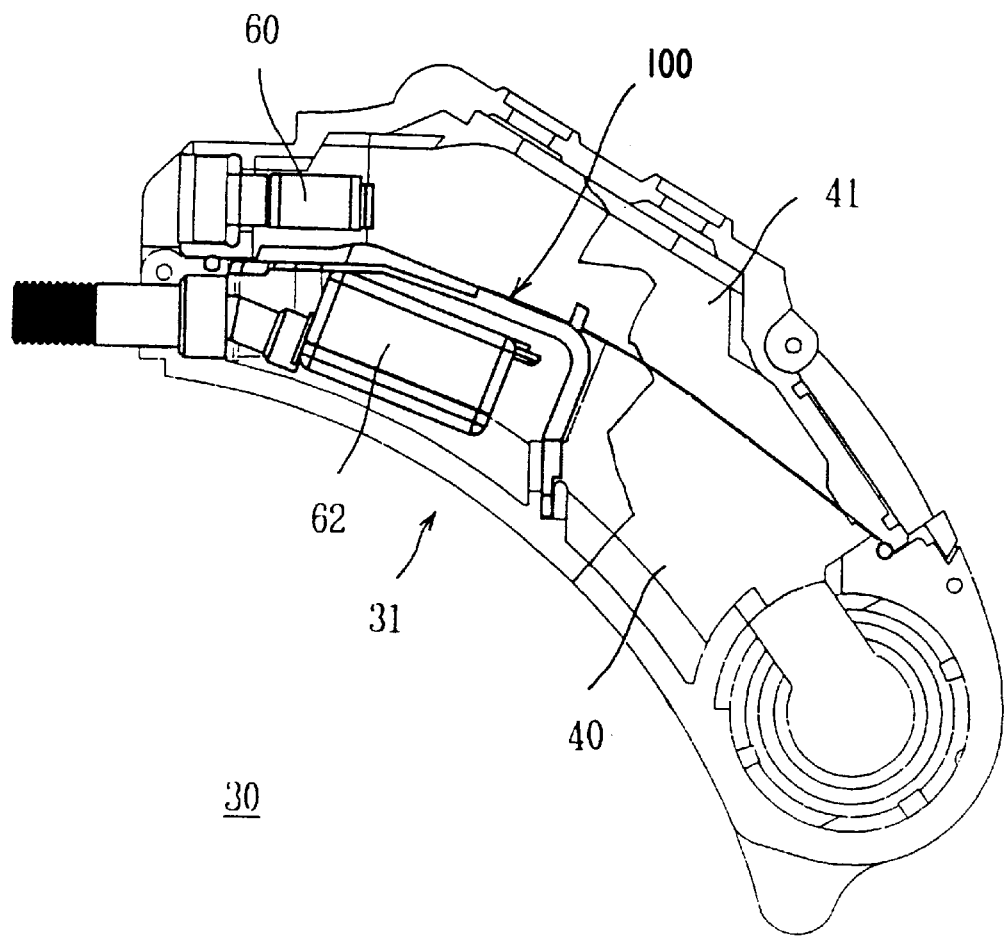
FIG. 18 is a sectional view showing a joint part between a case itself and case chassis in the hearing aid.

In this embodiment, as shown in FIG. 18, the microphone 60 positioning at the end part of the case 31 is contained in the case chassis 41, although this is different from the previous embodiment. Against this, the earphone positioning at the end part of the case 31 is contained in the case itself 40 as same as in the previous embodiment. In this manner, by containing the microphone in the case chassis 41, the case chassis 41 is divided from the box-like case 31 by a plane connecting from nearly the center of the end face of the case 31 to the back rear end of the case 31, and forms the overall back face of the case 31.

Therefore, in the hearing aid 30, when the case chassis 41 is opened, parts such as the microphone 60 and earphone 62 located in the case 31 are exposed, and hence, maintenance work such as part change can be easily done.

In addition, in the hearing aid 30, by dividing the case 31 in this manner, the joint part 100 between the case itself 40 and case chassis 41 is formed flat, and hence, uniform stress can be put to the seal packing 44 which is inserted into the joint part.

Figure 19:
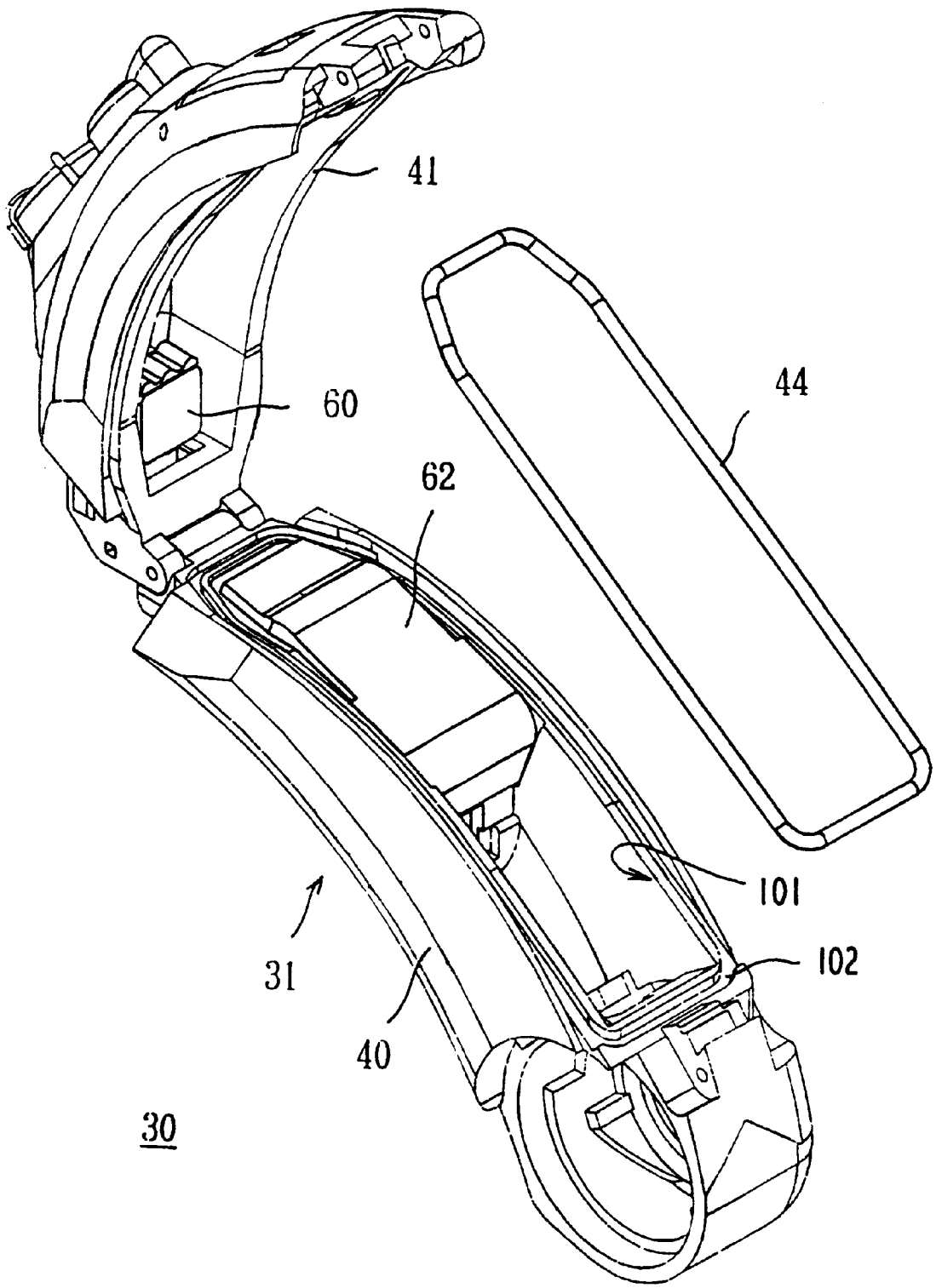
FIG. 19 is an exploded perspective view showing a seal packing inserted between the joint part.

Accordingly, the seal packing 44 inserted into the joint part 100 between the case itself 40 and case chassis 41, as shown in FIG. 19, corresponds to the form of the circumference edge face of the opening 101 formed in the back face of the case itself 40, and hence, the seal packing is enough in an approximately rectangular form without a part bent toward the joint part between the case itself 40 and case chassis 41. Incidentally, in the hearing aid 30, the joint part 100 is a little curved, but approximately flat, and since the seal packing 44 is formed of elastic material such as rubber material, this hearing aid can use the seal packing 44 in the approximately rectangular form which is formed by one plane.

Figure 1:
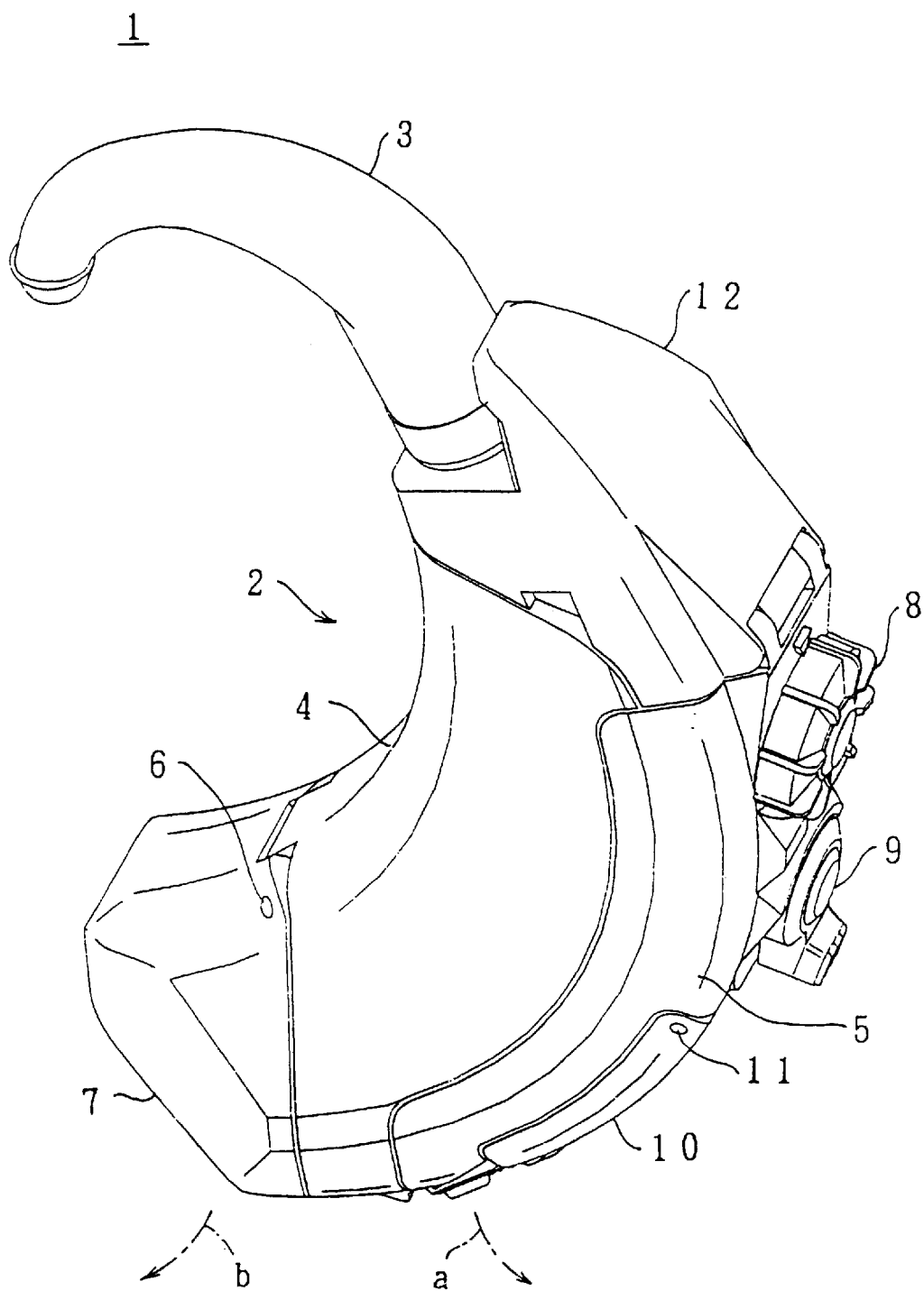
FIG. 1 is a perspective view showing a conventional waterproof type of hearing aid.
Figure 2:
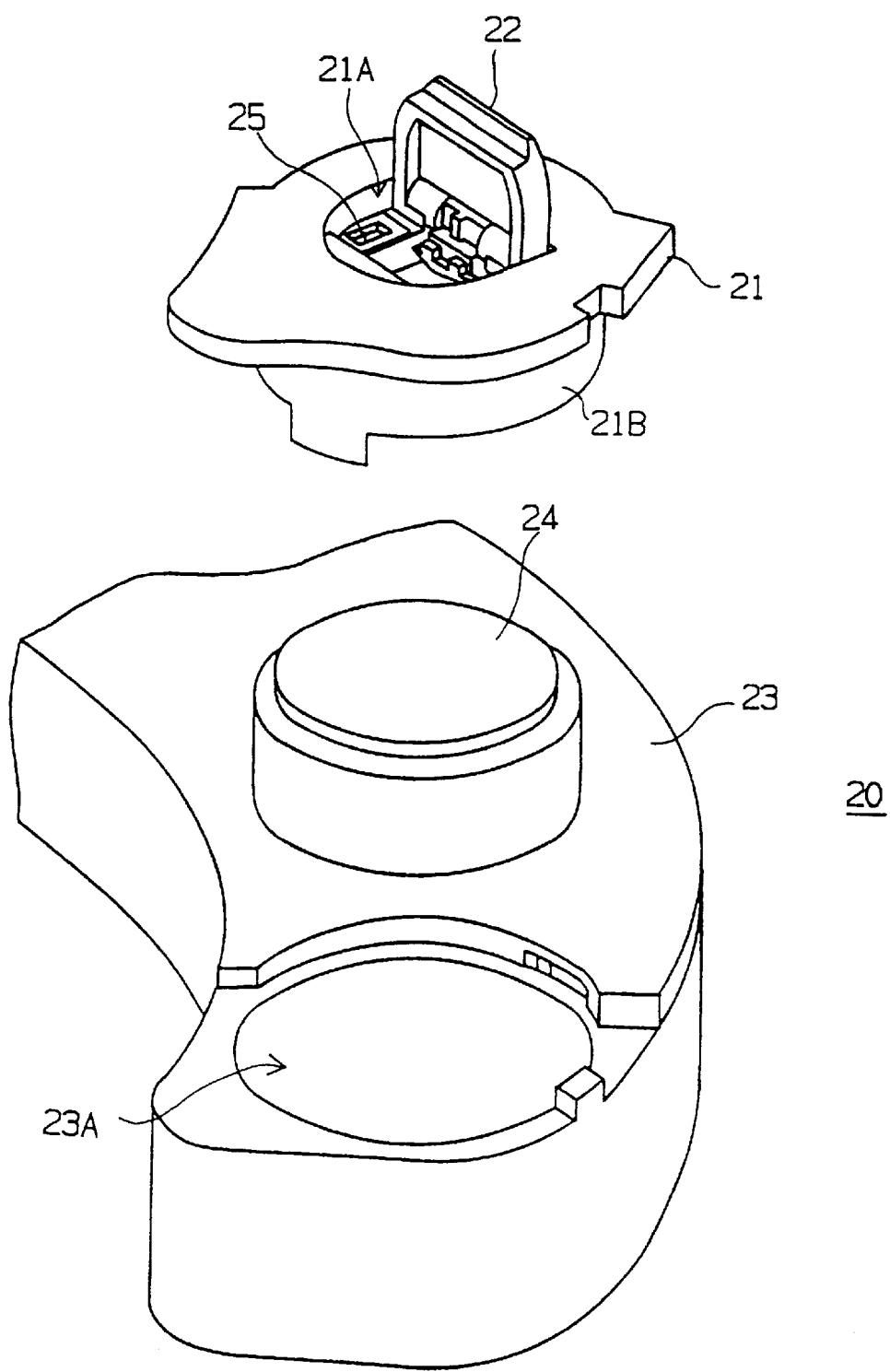
FIG. 2 is an schematic exploded perspective view showing a conventional waterproof type of hearing aid having a waterproof filter.
Figure 3:
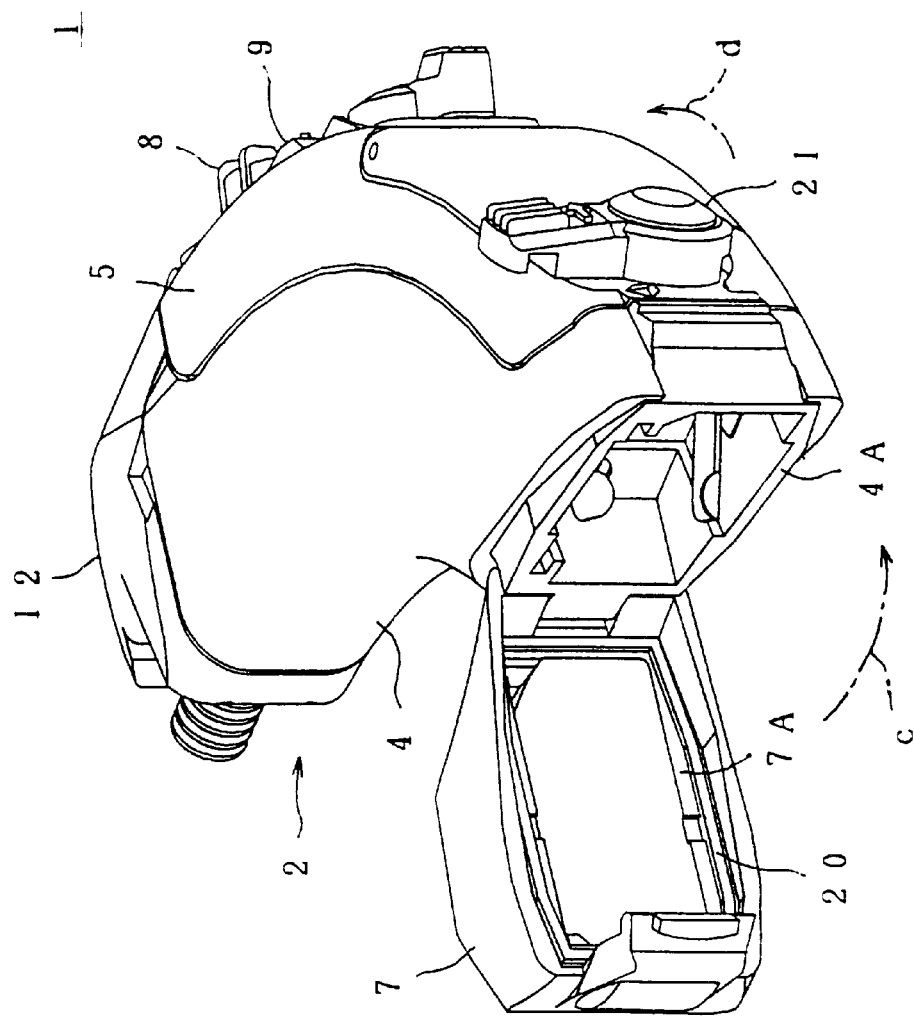
FIG. 3 is a perspective view for explanation of a seal packing between a battery cover and case itself in a hearing aid shown in FIG. 11.
Figure 4:
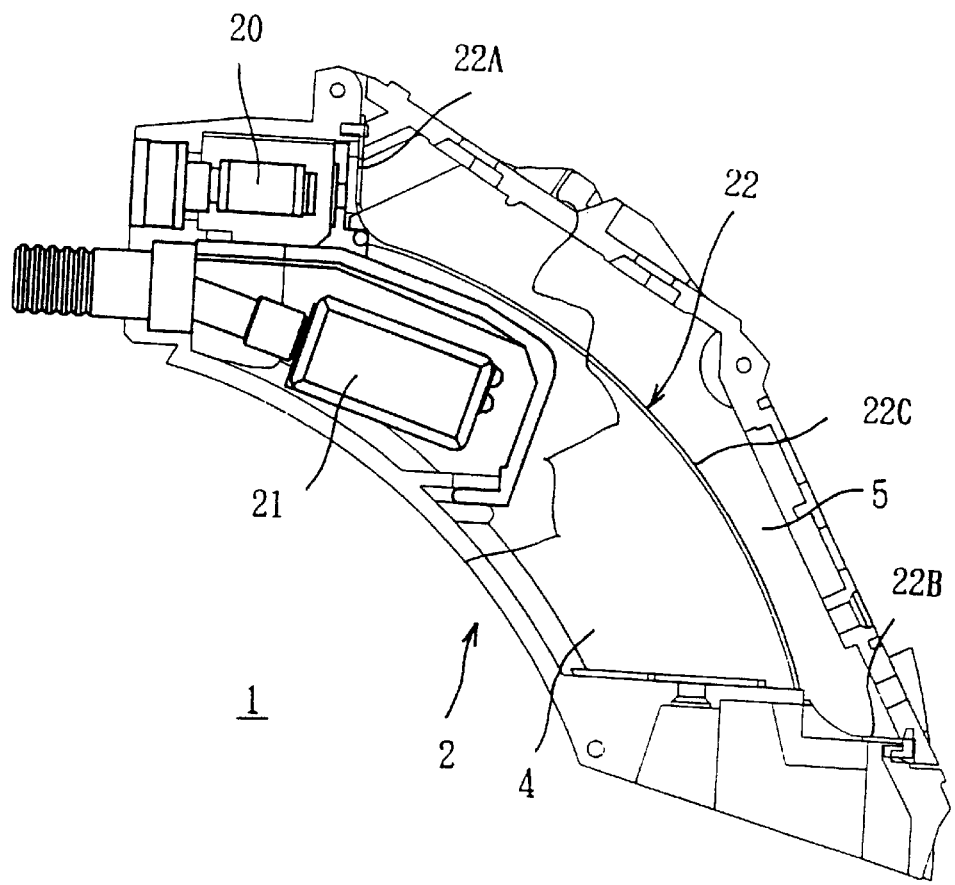
FIG. 4 is a sectional view showing a joint part between a case itself and case chassis in the ear-hung type of hearing aid.
Figure 5:
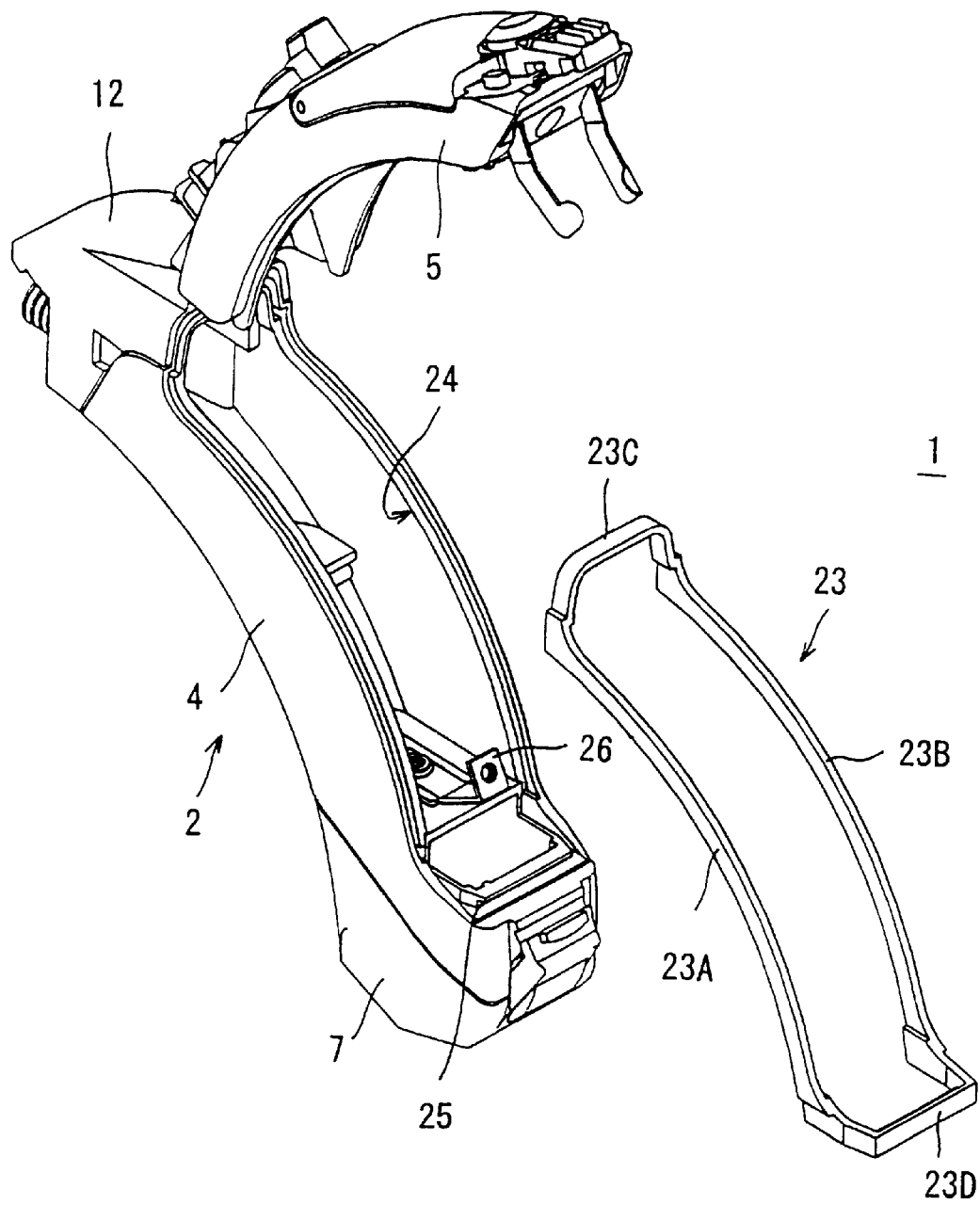
FIG. 5 is an exploded perspective view showing a seal packing inserted in to the joint part.

In this manner, in the hearing aid 30, after this seal packing is embedded with the slot 102 formed in the circumference edge face of the opening 101 in the case itself 40, the case chassis 41 and case itself 40 are screwed. Consequently, the hearing aid 30 is assembled as a whole as shown in FIG. 1, and can be sealed without a gap in the joint part between the case itself 40 and case chassis 41.

(3-2) Operation of the Embodiment

In the above constitution, by containing the earphone 62 in the case itself 40 and containing the microphone in the case chassis 41, it is possible to divide the case 31 by the plane connecting from nearly the center of the end face of the case 31 to the back rear end of the case 31. Therefore, in the hearing aid 30, the joint part 100 between the case itself 40 and case chassis 41 can be formed approximately flat.

Thus, in the hearing aid 30 which is assembled with the seal packing 44 inserted into the joint part 70 between the case itself 40 and case chassis 41, the uniform stress can be put to the seal packing 44, and hence, the joint part 70 can be securely sealed entirely.

In addition, in the hearing aid 30, since the joint part 100 between the case itself 40 and case chassis 41 is almost flat, the seal packing 44 inserted into the joint part 100 can have a simple structure without a bent part toward the joint.

Furthermore, since the case chassis 41 forms the whole back part of the case 31, parts such as the microphone 60 and earphone 62 are exposed when the case chassis 41 is opened, and hence, maintenance work such as part change can be easily done.

(3-3) Advantages of the Embodiment

According to the above constitution, by containing the earphone 62 in the case itself 40 and containing the microphone 60 in the case chassis 41, the joint part 100 between the case itself 40 and case chassis 41 can become almost flat. Therefore, the uniform stress can be put to the seal packing 44, and hence, this hearing aid 30 can securely seal the joint parts entirely and can increase the waterproof performance.

In addition, since the joint part 100 between the case itself 40 and case chassis 41 is almost flat, the seal packing 44 inserted into the joint part 100 can have a simple structure. Therefore, in the hearing aid 30, assembly work can become easy, and shaping of the seal packing 44 itself can become easy.

(3-4) Other Embodiment

Furthermore, in the above embodiment, the case that the microphone 60 is located in the case chassis 41 and the earphone 62 is located in the case itself 40 is described, the present invention is not limited to this. It is possible to get the same advantage as that of the above embodiment by locating the microphone in the case itself 40 and locating the earphone in the case chassis 41.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A battery receiving chamber that blocks an opening of a battery compartment, which is formed in a case, for attaching and detaching a battery by using a battery cover formed separately from the case, said battery receiving chamber comprising:

first convex parts that are located in an internal side face of said battery compartment and have inclined surfaces which increase in height toward the rotational direction in which a battery cover is detached from said battery compartment;

second convex parts that are located in said battery cover, corresponding to the first convex parts and have inclined surfaces which increase in height toward the rotational direction in which said battery cover is detached from said battery compartment; and waterproof means, which is inserted between said case and said battery cover, for preventing external moisture from entering through a gap between said case and said battery cover into said battery compartment;

wherein said battery cover is gradually raised from said case by sliding of said inclined surfaces of said second convex parts on said inclined surfaces of said first convex parts toward a higher place of said inclined surfaces of said first convex parts to thereby rotationally detach said battery cover from said battery compartment of said case.

2. The battery receiving chamber according to claim 1, comprising:

a third convex part located in an external side face of said battery compartment;

a knob that is located in a circumference edge face of an internal side face of said battery cover and rotates along an external side face of said battery compartment when said battery cover is attached or detached; and a guide slot that is located in correspondence to said third convex part in a side face of said knob opposite to said external side face of said battery compartment, and has an inclined surface that becomes gradually lower toward the direction in which said battery cover is embedded with said battery compartment;

wherein said battery cover is depressively contacted to said case itself by relative sliding of said third convex part along said inclined surface when said battery cover is rotationally attached.

3. The battery receiving chamber according to claim 2, comprising:

a slot that is located at a position that is a circumference side face forming an opening of said battery compartment for attaching and detaching a battery and is approximately opposite to said third convex part; and a fourth convex part that is located at a position that is an external circumference surface and is approximately opposite to said knob;

wherein said battery cover is fixed to said case itself by fitting of said fourth convex part with said slot when said third convex part is embedded with said guide slot in a predetermined position.

4. A waterproof externally worn hearing aid, comprising:

a concave part provided in a first side face of a case, wherein said case is formed in a curvature shape as a whole and said first side face of said case touches skin of a user when said hearing aid is worn;

an air vent provided in a bottom face of said concave part for communicating with the interior of said case and the exterior of said case;

waterproof means being disposed so as to block said air vent, for supplying air from the outside of said case to the interior of said case through said air vent, and for preventing invasion of moisture from the outside of said case through said air vent; and a slot extending from said concave part to a second side face of said case on said hearing aid, wherein said second side face of said case of said hearing aid does not touch skin of the user when said hearing aid is worn.

5. The hearing aid according to claim 4, wherein said concave part, said air vent and said slot are formed in a battery cover forming a part of said case of said hearing aid.

6. The hearing aid according to claim 4, wherein said slot is formed extending downwardly when said hearing aid is worn.

7. A waterproof externally worn hearing aid comprising:

a case comprising an outer circumference case half and an inner circumference case half being formed in a curvature shape as a whole when said inner and outer case halves are combined together, and a waterproof sealing member comprising an elastic member which is inserted into a joint part of said outer circumference case half and said inner circumference case half, wherein said joint part between said outer circumference case half and said inner circumference case half is formed substantially flat therethroughout.

* * * * *